US011685220B2

(12) United States Patent
Calchand et al.

(10) Patent No.: US 11,685,220 B2
(45) Date of Patent: Jun. 27, 2023

(54) CONTROL SYSTEMS AND METHODS FOR SUSPENSION SYSTEMS

(71) Applicant: DRIV Automotive Inc., Southfield, MI (US)

(72) Inventors: Nandish Calchand, Leuven (BE); Bert Vandersmissen, Lovenjoel (BE); Thom Heylands, Sint-Truiden (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 17/499,726

(22) Filed: Oct. 12, 2021

(65) Prior Publication Data
US 2023/0112405 A1  Apr. 13, 2023

(51) Int. Cl.
*B60G 17/04* (2006.01)
*B60G 17/08* (2006.01)
(Continued)

(52) U.S. Cl.
CPC ........... *B60G 17/08* (2013.01); *B60G 17/016* (2013.01); *B60G 17/0152* (2013.01);
(Continued)

(58) Field of Classification Search
CPC .. B60G 17/08; B60G 17/0152; B60G 17/016; B60G 2202/24; B60G 2400/0511;
(Continued)

(56) References Cited

U.S. PATENT DOCUMENTS

| 3,334,913 A | 8/1967 | Margala |
| 4,076,275 A | 2/1978 | Hiruma |

(Continued)

FOREIGN PATENT DOCUMENTS

| CN | 103807344 A | 5/2014 |
| CN | 204037280 U | 12/2014 |

(Continued)

OTHER PUBLICATIONS

International Search Report and Written Opinion regarding International Patent Application No. PCT/US2022/046021, dated Feb. 20, 2023.

(Continued)

*Primary Examiner* — Toan C To
(74) *Attorney, Agent, or Firm* — Harness, Dickey & Pierce, P.L.C.

(57) ABSTRACT

A control system includes: a target volume module configured to determine a target volume of hydraulic fluid within a suspension system of a vehicle based on a target pressure of the hydraulic fluid within the suspension system; a volume command module configured to generate a volume command based on the target volume and a present volume of the hydraulic fluid within first and second circuits; a command module configured to, based on the volume command, generate: a pump command for an electric hydraulic fluid pump; and first and second valve commands for first and second seat valves that regulate hydraulic fluid flow to and from the first and second circuits, respectively; a valve control module that actuates the first and second seat valves based on the first and second valve commands, respectively; and a pump control module that controls operation of the pump based on the pump command.

20 Claims, 10 Drawing Sheets

(51) Int. Cl.
*B60G 17/015* (2006.01)
*B60G 17/016* (2006.01)

(52) U.S. Cl.
CPC .. *B60G 2202/24* (2013.01); *B60G 2400/0511* (2013.01); *B60G 2400/0512* (2013.01); *B60G 2400/10* (2013.01); *B60G 2400/204* (2013.01); *B60G 2400/5182* (2013.01); *B60G 2500/104* (2013.01)

(58) Field of Classification Search
CPC ........ B60G 2400/0512; B60G 2400/10; B60G 2400/204; B60G 2400/5182; B60G 2500/104
USPC ....... 280/124.157, 124.158, 124.159, 124.16
See application file for complete search history.

(56) References Cited

U.S. PATENT DOCUMENTS

| | | | |
|---|---|---|---|
| 4,270,771 A | 6/1981 | Fujii | |
| 4,625,993 A | 12/1986 | Williams et al. | |
| 4,830,394 A | 5/1989 | Tanaka et al. | |
| 4,848,790 A | 7/1989 | Fukunaga et al. | |
| 4,911,468 A | 3/1990 | Fukunaga | |
| 4,911,470 A | 3/1990 | Fukunaga | |
| 4,999,777 A | 3/1991 | Schussler et al. | |
| 5,033,770 A | 7/1991 | Kamimura et al. | |
| 5,037,128 A | 8/1991 | Okuyama et al. | |
| 5,056,812 A | 10/1991 | Takehara et al. | |
| 5,074,624 A | 12/1991 | Stauble et al. | |
| 5,085,458 A | 2/1992 | Kii et al. | |
| 5,085,459 A | 2/1992 | Sato et al. | |
| 5,097,419 A | 3/1992 | Lizell | |
| 5,100,167 A | 3/1992 | Kamimura | |
| 5,119,297 A | 6/1992 | Burna et al. | |
| 5,145,206 A | 9/1992 | Williams | |
| 5,160,161 A | 11/1992 | Tsukamoto et al. | |
| 5,162,995 A | 11/1992 | Ikemoto et al. | |
| 5,174,598 A | 12/1992 | Sato et al. | |
| 5,193,845 A | 3/1993 | Yokote et al. | |
| 5,199,854 A | 4/1993 | Aoyama | |
| 5,322,319 A | 6/1994 | Tanaka et al. | |
| 5,515,277 A | 5/1996 | Mine | |
| 5,529,324 A | 6/1996 | Krawczyk et al. | |
| 5,556,115 A | 9/1996 | Heyring | |
| 5,562,305 A | 10/1996 | Heyring et al. | |
| 5,601,307 A | 2/1997 | Heyring et al. | |
| 5,630,623 A | 5/1997 | Ganzel | |
| 5,631,632 A | 5/1997 | Nakashima et al. | |
| 5,735,540 A | 4/1998 | Schiffler | |
| 5,769,400 A | 6/1998 | Holzl et al. | |
| 6,010,139 A | 1/2000 | Heyring et al. | |
| 6,259,982 B1 | 7/2001 | Williams et al. | |
| 6,266,590 B1 * | 7/2001 | Kutscher | B60G 17/0523 60/407 |
| 6,502,837 B1 | 1/2003 | Hamilton et al. | |
| 6,519,517 B1 | 2/2003 | Heyring et al. | |
| 6,556,908 B1 | 4/2003 | Lu et al. | |
| 6,669,216 B1 | 12/2003 | Elser et al. | |
| 6,761,371 B1 | 7/2004 | Heyring et al. | |
| 6,859,713 B2 | 2/2005 | Pallot | |
| 6,880,332 B2 * | 4/2005 | Pfaff | F15B 11/006 60/460 |
| 7,311,314 B2 | 12/2007 | Kasamatsu | |
| 7,311,316 B2 | 12/2007 | Yasui et al. | |
| 7,350,793 B2 | 4/2008 | Munday | |
| 7,472,914 B2 | 1/2009 | Anderson et al. | |
| 7,686,309 B2 | 3/2010 | Munday et al. | |
| 7,862,052 B2 | 1/2011 | Germain | |
| 8,075,002 B1 | 12/2011 | Pionke et al. | |
| 8,123,235 B2 | 2/2012 | Monk et al. | |
| 8,459,619 B2 * | 6/2013 | Trinh | B60G 17/0424 267/64.23 |
| 8,672,337 B2 | 3/2014 | van der Knaap et al. | |
| 8,695,768 B2 | 4/2014 | Kiriyama | |
| 9,080,631 B2 | 7/2015 | Hoult | |
| 9,150,282 B2 | 10/2015 | Heyring et al. | |
| 9,597,940 B2 | 3/2017 | Anderson et al. | |
| 9,829,014 B2 * | 11/2017 | Kleitsch | F15B 11/165 |
| 10,350,958 B2 | 7/2019 | Stolle | |
| 10,421,330 B2 | 9/2019 | Jeong | |
| 10,752,075 B1 * | 8/2020 | Shukla | B60G 17/052 |
| 11,220,152 B2 | 1/2022 | Witte | |
| 2001/0006285 A1 | 7/2001 | Franzini | |
| 2004/0061292 A1 | 4/2004 | Hall | |
| 2004/0113377 A1 | 6/2004 | Klees | |
| 2006/0151969 A1 | 7/2006 | Revill et al. | |
| 2006/0186728 A1 * | 8/2006 | Mizuta | B60G 17/0152 303/3 |
| 2007/0278752 A1 * | 12/2007 | Schedgick | B60G 17/0416 280/5.514 |
| 2008/0238004 A1 | 10/2008 | Turco et al. | |
| 2008/0269987 A1 | 10/2008 | Barron et al. | |
| 2008/0272561 A1 | 11/2008 | Monk et al. | |
| 2009/0140501 A1 | 6/2009 | Taylor et al. | |
| 2012/0098172 A1 * | 4/2012 | Trinh | B60G 17/0155 701/37 |
| 2013/0103259 A1 | 4/2013 | Eng et al. | |
| 2015/0102921 A1 | 4/2015 | Kim | |
| 2017/0240017 A1 | 8/2017 | Vandersmissen et al. | |
| 2017/0305226 A1 * | 10/2017 | Okimura | B60G 17/033 |
| 2018/0345747 A1 | 12/2018 | Boon et al. | |
| 2019/0178695 A1 | 6/2019 | Bittner et al. | |
| 2019/0211897 A1 | 7/2019 | Schneider et al. | |
| 2019/0389271 A1 | 12/2019 | Zanziger | |
| 2020/0122539 A1 | 4/2020 | Gummesson | |
| 2020/0223274 A1 | 7/2020 | Tucker et al. | |
| 2022/0380004 A1 | 12/2022 | Walker et al. | |

FOREIGN PATENT DOCUMENTS

| | | |
|---|---|---|
| CN | 204037282 U | 12/2014 |
| CN | 102862456 B | 3/2015 |
| CN | 207059676 U | 3/2018 |
| CN | 207902078 U | 9/2018 |
| CN | 106739915 B | 8/2019 |
| CN | 110329235 B | 5/2021 |
| CN | 214057159 U | 8/2021 |
| CN | 114537072 A | 5/2022 |
| DE | 2844413 C2 | 9/1989 |
| DE | 102008024871 A1 | 11/2009 |
| DE | 102009053758 A1 | 6/2010 |
| DE | 102018206462 A1 | 10/2019 |
| DE | 102020001633 A1 | 10/2020 |
| DE | 102019218699 A1 | 6/2021 |
| EP | 0419865 A1 | 4/1991 |
| EP | 1518721 A1 | 3/2005 |
| EP | 1970229 A1 | 9/2008 |
| EP | 3643544 A1 | 4/2020 |
| FR | 2175848 A1 | 10/1973 |
| GB | 2344323 A | 6/2000 |
| JP | 2005 059613 A | 3/2005 |
| JP | 2005145137 A | 6/2005 |
| JP | 2018016141 A | 2/2018 |
| KR | 20140005557 A | 1/2014 |
| WO | WO-9633879 A1 | 10/1996 |
| WO | WO-2007098559 A1 | 9/2007 |
| WO | WO-2009111826 A1 | 9/2009 |
| WO | WO-2014/152095 A1 | 9/2014 |
| WO | WO-2015055313 A1 | 4/2015 |
| WO | WO-2016072510 A1 | 5/2016 |
| WO | WO-2020185968 A1 | 9/2020 |
| WO | WO-2020214666 A1 | 10/2020 |

OTHER PUBLICATIONS (Corrected) International Search Report and Written Opinion regarding International Patent Application No. PCT/US2022/046037, dated Jan. 30, 2023.

(56) References Cited

OTHER PUBLICATIONS (Corrected) International Search Report and Written Opinion regarding International Patent Application No. PCT/US2022/046038, dated Jan. 27, 2023.
International Search Report and Written Opinion regarding International Patent Application No. PCT/US2022/046053, dated Jan. 30, 2023.
International Search Report and Written Opinion regarding International Patent Application No. PCT/US2022/046033, dated Feb. 2, 2023.
International Search Report and Written Opinion regarding International Patent Application No. PCT/US2022/046048, dated Feb. 6, 2023.
International Search Report and Written Opinion regarding International Patent Application No. PCT/US2022/046038, dated Feb. 6, 2023.
International Search Report and Written Opinion regarding International Patent Application No. PCT/US2022/046037, dated Feb. 6, 2023.
International Search Report and Written Opinion regarding International Patent Application No. PCT/US2022/046029, dated Dec. 20, 2022.
International Search Report and Written Opinion regarding International Patent Application No. PCT/US2022/046042, dated Dec. 20, 2022.
International Search Report and Written Opinion regarding International Patent Application No. PCT/US2022/046019, dated Dec. 20, 2022.
International Search Report and Written Opinion regarding International Patent Application No. PCT/US2022/046025, dated Jan. 3, 2023.
International Search Report and Written Opinion regarding International Patent Application No. PCT/US2022/046023, dated Jan. 4, 2023.
"Boyle's Law Definition & Practical Applications of Boyle's Gas Law", Apr. 24, 2019 (Apr. 24, 2019), XP093008924, Retrieved from the Internet: <URL:https://inspectapedia.com/aircond/Boyles_Gas_Law.php> [retrieved on Dec. 16, 2022] p. 1-p. 4.
International Search Report and Written Opinion regarding International Patent Application No. PCT/US2022/046027, dated Jan. 2, 2023.

\* cited by examiner

CONTROL SYSTEMS AND METHODS FOR SUSPENSION SYSTEMS

FIELD

The present disclosure relates generally to suspension systems for motor vehicles and more particularly to suspension systems that resist the pitch and roll movements of a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean right or left during corning (e.g., in turns), pitch forward under deceleration (e.g., under braking), and pitch back under acceleration. The lateral acceleration the vehicle experiences in turns causes a roll moment where the vehicle will lean/squat to the right when turning left and to the left when turning right. The fore and aft acceleration the vehicle experiences under acceleration and braking causes a pitch moment where the vehicle will lean forward loading the front axle during braking and aft, loading the rear axle, under acceleration. These roll and pitch moments decrease grip, cornering performance, and braking performance and can also be uncomfortable to the driver and passengers. Many vehicles are equipped with stabilizer bars/anti-roll bars, which are mechanical systems that help counteract the roll and/or pitch moments experienced during driving. For example, anti-roll bars are typically mechanical linkages that extend laterally across the width of the vehicle between the right and left dampers. When one of the dampers extends, the anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the dampers. Second, stabilizer bars/anti-roll bars are reactive and work when the suspension starts moving (i.e. leaning). Such mechanical systems cannot be easily switched off or cancelled out when roll stiffness is not needed. Some vehicles do have stabilizer bar/anti-roll bar disconnects that may be manually or electronically actuated, but the complexity and cost associated with these systems may make them ill-suited for most vehicle applications.

In an effort to augment or replace traditional mechanical stabilizer bars/anti-roll bars, anti-roll suspension systems are being developed that hydraulically connect two or more dampers in a hydraulic circuit where the extension of one damper produces a pressure change in the other damper(s) in the hydraulic circuit that makes it more difficult to compress the other damper(s) in the hydraulic circuit. This pressure change in the other damper(s) increases the roll stiffness of the suspension system of the vehicle. However, the downside of such systems is that ride comfort is more difficult to achieve because bump forces can be transmitted from one damper to another damper across the hydraulic circuit resulting in unwanted suspension movement. Accordingly, there remains a need for improved vehicle suspension systems that can minimize pitch and roll while maintaining acceptable levels of ride comfort.

Some suspension systems can include a large number of individually controllable valves which can fluidly connect different hydraulic circuits of a suspension system or fluidly isolate different hydraulic circuits of the suspension system. There is a need to accurately control pressure and volume of hydraulic fluid in each of the hydraulic circuits of a suspension system, such as for roll control or for roll and pitch control.

SUMMARY

In a feature, a control system for a suspension system of a vehicle includes: a target volume module configured to determine a target volume of hydraulic fluid within the suspension system of the vehicle based on a target pressure of the hydraulic fluid within the suspension system; a volume command module configured to generate a volume command based on the target volume and a present volume of the hydraulic fluid within first and second circuits of the suspension system; a command module configured to, based on the volume command, generate: a pump command for an electric hydraulic fluid pump; and first and second valve commands for first and second seat valves that regulate hydraulic fluid flow to and from the first and second circuits, respectively, of the suspension system; a valve control module that actuates the first and second seat valves based on the first and second valve commands, respectively; and a pump control module that controls operation of the electric hydraulic fluid pump based on the pump command.

In further features, the volume command module is configured to generate the volume command based on adjusting the present volume of the hydraulic fluid within the first and second circuits of the suspension system toward the target volume.

In further features, the volume command module is configured to generate the volume command further based on the target pressure and first and second pressures within the first and second circuits, respectively, of the suspension system.

In further features, an equivalent static pressure module is configured to determine an equivalent static pressure based on the first and second pressures, where the volume command module is configured to generate the volume command based on adjusting the equivalent static pressure toward the target pressure.

In further features, a target pressure module configured to determine the target pressure based on at least one of (a) a roll of the vehicle and (b) a pitch of the vehicle.

In further features, a target pressure module configured to determine the target pressure further based on a vehicle speed.

In further features, a target pressure module configured to determine the target pressure further based on a mode of the suspension system.

In further features, a volume module configured to: determine a first volume of hydraulic fluid in the first circuit based on a first pressure within the first circuit; and determine a second volume of hydraulic fluid in the second circuit based on a second pressure within the second circuit, where the volume command module is configured to determine the present volume of the hydraulic fluid within first and second circuits of the suspension system based on a sum of the first volume and the second volume.

In further features, a factor module is configured to determine a volume distribution factor based on the first and second volumes, where the volume command module is configured to determine the volume command further based on the volume distribution factor.

In further features, a dynamics mode module is configured to set a vehicle dynamics mode based on an acceleration of the vehicle, where the command module is configured to generate the pump command, the first valve command, and the second valve command further based on the vehicle dynamics mode.

In a feature, a control method for a suspension system of a vehicle includes: determining a target volume of hydraulic fluid within the suspension system of the vehicle based on a target pressure of the hydraulic fluid within the suspension system; generating a volume command based on the target volume and a present volume of the hydraulic fluid within first and second circuits of the suspension system; based on the volume command, generating: a pump command for an electric hydraulic fluid pump; and first and second valve commands for first and second seat valves that regulate hydraulic fluid flow to and from the first and second circuits, respectively, of the suspension system; actuating the first and second seat valves based on the first and second valve commands, respectively; and controlling operation of the electric hydraulic fluid pump based on the pump command.

In further features, generating the volume command includes generating the volume command based on adjusting the present volume of the hydraulic fluid within the first and second circuits of the suspension system toward the target volume.

In further features, generating the volume command includes generating the volume command further based on the target pressure and first and second pressures within the first and second circuits, respectively, of the suspension system.

In further features, the method further includes determining an equivalent static pressure based on the first and second pressures, where generating the volume command includes generating the volume command based on adjusting the equivalent static pressure toward the target pressure.

In further features, the method further includes determining the target pressure based on at least one of (a) a roll of the vehicle and (b) a pitch of the vehicle.

In further features, the method further includes determining the target pressure based on a vehicle speed.

In further features, the method further includes determining the target pressure based on a mode of the suspension system.

In further features, the method further includes: determining a first volume of hydraulic fluid in the first circuit based on a first pressure within the first circuit; and determining a second volume of hydraulic fluid in the second circuit based on a second pressure within the second circuit, where determining the present volume includes determining the present volume of the hydraulic fluid within first and second circuits of the suspension system based on a sum of the first volume and the second volume.

In further features, the method further includes determining a volume distribution factor based on the first and second volumes, where determining the volume command includes determining the volume command further based on the volume distribution factor.

In further features, the method further includes setting a vehicle dynamics mode based on an acceleration of the vehicle, where generating the pump command includes generating the pump command, the first valve command, and the second valve command further based on the vehicle dynamics mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
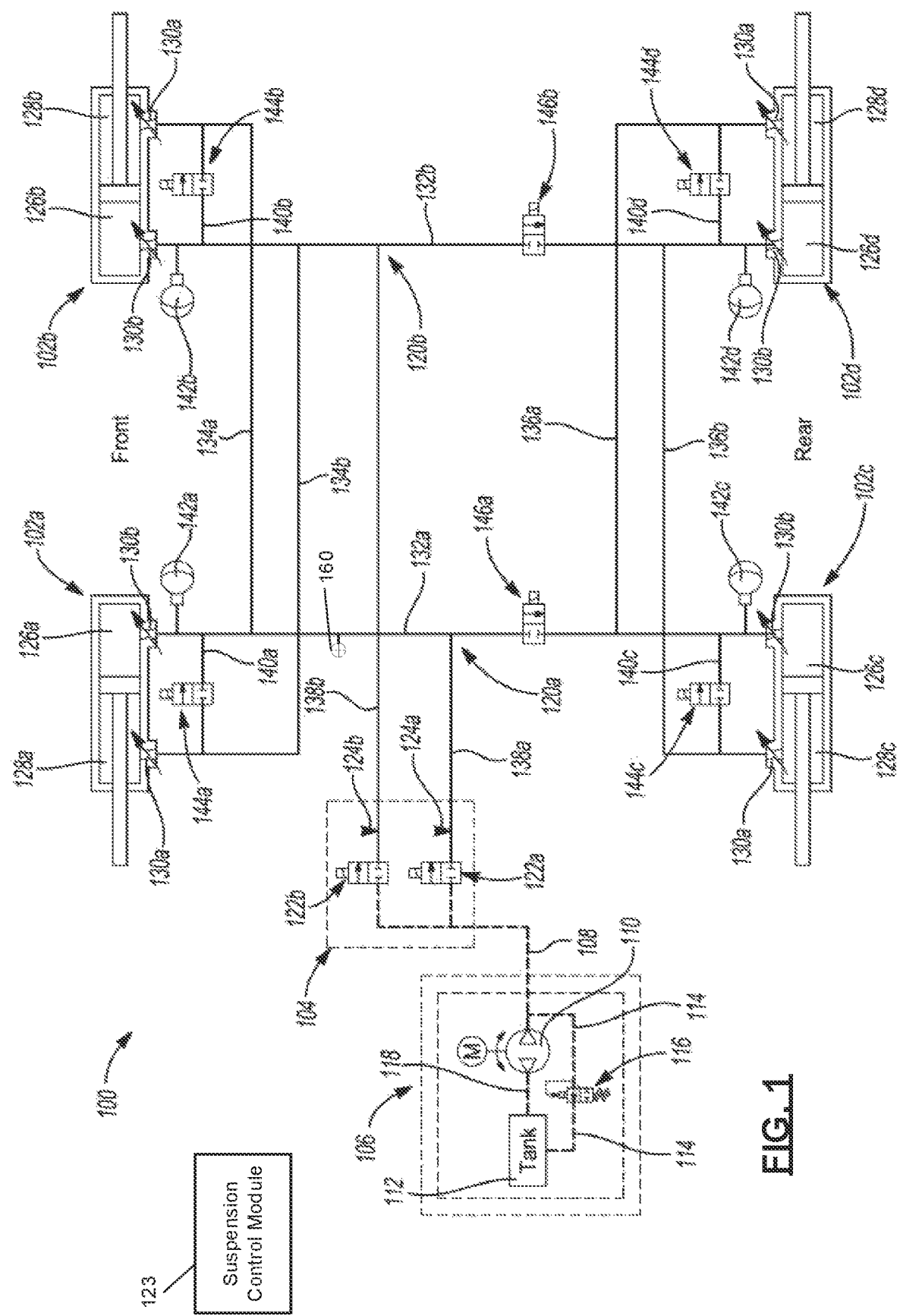
FIG. 1 is a schematic diagram illustrating an example suspension system that includes two comfort valves that open and close the hydraulic lines connecting the two front dampers to the two rear dampers of the system.

With reference to FIG. 1, a suspension system 100 including a front left damper 102a, a front right damper 102b, a back left damper 102c, and a back right damper 102d. While it should be appreciated that the suspension system 100 described herein may include a different number of dampers than those shown in the drawings, in most automotive applications, four dampers are used at each corner of a vehicle to control vertical movements of the front and rear wheels of the vehicle. Thus, the front left damper 102a controls (e.g., dampens) up and down (i.e., vertical) movements of the front left wheel of the vehicle, the front right damper 102b controls (e.g., dampens) up and down (i.e., vertical) movements of the front right wheel of the vehicle, the back left damper 102c controls (e.g., dampens) up and down (i.e., vertical) movements of the back left wheel of the vehicle, and the back right damper 102d controls (e.g., dampens) up and down (i.e., vertical) movements of the back right wheel of the vehicle.

The suspension system 100 also includes a manifold assembly 104 that is connected in fluid communication with a pump assembly 106 by a pump hydraulic line 108. Although other configurations are possible, in the illustrated example, the pump assembly 106 includes a bi-directional pump 110, a hydraulic reservoir 112 (e.g., a tank), and a bypass hydraulic line 114 that can be opened and closed by a pressure relief valve 116. The bi-directional pump 110 includes a first inlet/outlet port that is connected to the pump hydraulic line 108 and a second inlet/outlet port that is connected in fluid communication with the hydraulic reservoir 112 by a reservoir hydraulic line 118. The bi-directional pump 110 may operate (i.e., pump fluid) in two opposite directions depending on the polarity of the electricity that is supplied to the pump 110, so the first inlet/outlet port may operate as either an inlet port or an outlet port depending on the direction the bi-directional pump 110 is operating in and the same is true for the second inlet/outlet port of the bi-directional pump 110. In the example where the first inlet/outlet port is operating as an inlet port for the bi-directional pump 110 and the second inlet/outlet port is operating as an outlet port for the bi-directional pump 110, the bi-directional pump 110 draws in hydraulic fluid from the pump hydraulic line 108 via the first inlet/outlet port and discharges hydraulic fluid into the reservoir hydraulic line 118 via the second inlet/outlet port. As such, the bi-directional pump 110 produces a negative pressure in the pump hydraulic line 108 that can be used by manifold assembly 104 to reduced fluid pressure in the suspension system 100. In the example where the second inlet/outlet port is operating as an inlet port for the bi-directional pump 110 and the first inlet/outlet port is operating as an outlet port for the bi-directional pump 110, the bi-directional pump 110 draws in hydraulic fluid from the reservoir hydraulic line 118 via the second inlet/outlet port and discharges hydraulic fluid into the pump hydraulic line 108 via the first inlet/outlet port. As such, the bi-directional pump 110 produces a positive pressure in the pump hydraulic line 108 that can be used by manifold assembly 104 to increase fluid pressure in the suspension system 100. The bypass hydraulic line 114 runs from the pump hydraulic line 108 to the hydraulic reservoir 112 and bleeds fluid back into the hydraulic reservoir 112 when the pressure in the pump hydraulic line 108 exceeds a threshold pressure that causes the pressure relief valve 116 to open.

The manifold assembly 104 is connected in fluid communication with the front and rear dampers 102a, 102b, 102c, 102d by first and second hydraulic circuits 120a, 120b. The manifold assembly 104 includes first and second manifold valves 122a, 122b that are connected in parallel with the pump hydraulic line 108. The first hydraulic circuit 120a is connected in fluid communication with the first manifold valve 122a and the second hydraulic circuit 120b is connected in fluid communication with the second manifold valve 122b. The manifold assembly 104 also includes a first pressure sensor 124a that is arranged to monitor the pressure in the first hydraulic circuit 120a and a second pressure sensor 124b that is arranged to monitor the pressure in the second hydraulic circuit 120b. The bi-directional pump 110 of the pump assembly 106 and first and second pressure sensors 124a, 124b and the first and second manifold valves 122a, 122b of the manifold assembly 104 are electrically connected to a suspension control module 123, which is configured to activate (i.e., turn on in forward or reverse) the bi-directional pump 110 and electronically actuate (i.e., open and close) the first and second manifold valves 122a, 122b in response to various inputs, including signals from the first and second pressure sensors 124a, 124b. When the suspension control module 123 opens the first and second manifold valves 122a, 122b, the fluid pressure in the first and second hydraulic circuits 120a, 120b increases or decreases, respectively, depending on which direction the bi-directional pump 110 is running in.

The anti-roll capabilities of the suspension system 100 will be explained in greater detail below. However, from FIG. 1 it should be appreciated that fluid pressure in the first and second hydraulic circuits 120a, 120b operate to dynamically adjust the roll stiffness of the vehicle and can be used to either augment or completely replace mechanical stabilizer bars/anti-roll bars. Such mechanical systems require relatively straight, unobstructed runs between each of the front dampers 102a, 102b and each of the back dampers 102c, 102d. Accordingly, the suspension system 100 disclosed herein offers packaging benefits because the dampers 102a, 102b, 102c, 102d only need to be hydraulically connected to the manifold assembly 104 and to the suspension control module 123.

Each of the dampers 102a, 102b, 102c, 102d of the suspension system 100 includes a damper housing, a piston rod, and a piston that is mounted on the piston rod. The piston is arranged in sliding engagement with the inside of the damper housing such that the piston divides the damper housing into compression and rebound chambers. As such, the front left damper 102a includes a first compression chamber 126a and a first rebound chamber 128a, the front right damper 102b includes a second compression chamber 126b and a second rebound chamber 128b, the back left damper 102c includes a third compression chamber 126c and a third rebound chamber 128c, and the back right damper 102d includes a fourth compression chamber 126d and a fourth rebound chamber 128d.

In each damper 102a, 102b, 102c, 102d, the piston is a closed piston with no fluid flow paths defined within or by its structure. In addition, there are no other fluid flow paths in the damper housing such that no fluid is communicated between the compression and rebound chambers of the dampers 102a, 102b, 102c, 102d except through the first and second hydraulic circuits 120a, 120b. The rebound chambers 128a, 128b, 128c, 128d of the dampers 102a, 102b, 102c, 102d decrease in volume during rebound/extension strokes and increase in volume during compression strokes of the dampers 102a, 102b, 102c, 102d. The compression chambers 126a, 126b, 126c, 126d of the dampers 102a, 102b, 102c, 102d decrease in volume during compression strokes of the dampers 102a, 102b, 102c, 102d and increase in volume during rebound/extension strokes of the dampers 102a, 102b, 102c, 102d.

Each damper 102a, 102b, 102c, 102d also includes rebound and compression chamber ports 130a, 130b in the damper housing that are each provided with dampening valves. The rebound chamber port 130a is arranged in fluid communication with the rebound chamber 128a, 128b, 128c, 128d of the damper 102a, 102b, 102c, 102d and the second port 130b is arranged in fluid communication with the compression chamber 126a, 126b, 126c, 126d of the damper 102a, 102b, 102c, 102d. The dampening valves in the rebound and compression chamber ports 130a, 130b can be passive/spring-biased valves (e.g., spring-disc stacks) or active valves (e.g., electromechanical valves) and control fluid flow into and out of the compression and rebound chambers of the dampers 102a, 102b, 102c, 102d to provide one or more rebound dampening rates and compression dampening rates for each of the dampers 102a, 102b, 102c, 102d.

The first hydraulic circuit 120a includes a first longitudinal hydraulic line 132a that extends between and fluidly connects the second port 130b (to the first compression chamber 126a) of the front left damper 102a and the second port 130b (to the third compression chamber 126c) of the back left damper 102c. The first hydraulic circuit 120a includes a front hydraulic line 134a that extends between and fluidly connects the first longitudinal hydraulic line 132a and the rebound chamber port 130a (to the second rebound chamber 128b) of the front right damper 102b. The first hydraulic circuit 120a also includes a rear hydraulic line 136a that extends between and fluidly connects the first longitudinal hydraulic line 132a and the rebound chamber port 130a (to the fourth rebound chamber 128d) of the back right damper 102d. The first hydraulic circuit 120a further includes a first manifold hydraulic line 138a that extends between and fluidly connects the first longitudinal hydraulic line 132a and the first manifold valve 122a. The second hydraulic circuit 120b includes a second longitudinal hydraulic line 132b that extends between and fluidly connects the compression chamber port 130b (to the second compression chamber 126b) of the front right damper 102b and the compression chamber port 130b (to the fourth compression chamber 126d) of the back right damper 102d. The second hydraulic circuit 120b includes a front hydraulic line 134b that extends between and fluidly connects the second longitudinal hydraulic line 132b and the rebound chamber port 130a (to the first rebound chamber 128a) of the front left damper 102a. The second hydraulic circuit 120b also includes a rear hydraulic line 136b that extends between and fluidly connects the second longitudinal hydraulic line 132b and the rebound chamber port 130a (to the third rebound chamber 128c) of the back left damper 102c. The second hydraulic circuit 120b further includes a second manifold hydraulic line 138b that extends between and fluidly connects the second longitudinal hydraulic line 132b and the second manifold valve 122b. It should be appreciated that the word "longitudinal" as used in the first and second longitudinal hydraulic lines 132a, 132b simply means that the first and second longitudinal hydraulic lines 132a, 132b run between the front dampers 102a, 102b and the back dampers 102c, 102d generally. The first and second longitudinal hydraulic lines 132a, 132b need not be linear or arranged in any particular direction as long as they ultimately connect the front dampers 102a, 102b and the back dampers 102c, 102d.

The suspension system 100 also includes four bridge hydraulic lines 140a, 140b, 140c, 140d that fluidly couple the first and second hydraulic circuits 120a, 120b and each corner of the vehicle. The four bridge hydraulic lines 140a, 140b, 140c, 140d include a front left bridge hydraulic line 140a that extends between and fluidly connects the first longitudinal hydraulic line 132a of the first hydraulic circuit 120a and the front hydraulic line 134b of the second hydraulic circuit 120b, a front right bridge hydraulic line 140b that extends between and fluidly connects the front hydraulic line 134a of the first hydraulic circuit 120a and the second longitudinal hydraulic line 132b of the second hydraulic circuit 120b, a back left bridge hydraulic line 140c that extends between and fluidly connects the first longitudinal hydraulic line 132a of the first hydraulic circuit 120a and the rear hydraulic line 136b of the second hydraulic circuit 120b, and a back right bridge hydraulic line 140d that extends between and fluidly connects the rear hydraulic line 136a of the first hydraulic circuit 120a and the second longitudinal hydraulic line 132b of the second hydraulic circuit 120b.

The front left bridge hydraulic line 140a is connected to the first longitudinal hydraulic line 132a between the compression chamber port 130b of the front left damper 102a and the front hydraulic line 134a of the first hydraulic circuit 120a. The front right bridge hydraulic line 140b is connected to the second longitudinal hydraulic line 132b between the compression chamber port 130b of the front right damper 102b and the front hydraulic line 134b of the second hydraulic circuit 120b. The back left bridge hydraulic line 140c is connected to the first longitudinal hydraulic line 132a between the compression chamber port 130b of the back left damper 102c and the rear hydraulic line 136a of the first hydraulic circuit 120a. The back right bridge hydraulic line 140d is connected to the second longitudinal hydraulic line 132b between the compression chamber port 130b of the back right damper 102d and the rear hydraulic line 136b of the second hydraulic circuit 120b. In the illustrated example, the various hydraulic lines are made of flexible tubing (e.g., hydraulic hoses), but it should be appreciated that other conduit structures and/or fluid passageways can be used.

A front left accumulator 142a is arranged in fluid communication with the first longitudinal hydraulic line 132a at a location between the compression chamber port 130b of the front left damper 102a and the front left bridge hydraulic line 140a. A front right accumulator 142b is arranged in fluid communication with the second longitudinal hydraulic line 132b at a location between the compression chamber port 130b of the front right damper 102b and the front right bridge hydraulic line 140b. A back left accumulator 142c is arranged in fluid communication with the first longitudinal hydraulic line 132a at a location between the compression chamber port 130b of the back left damper 102c and the back left bridge hydraulic line 140c. A back right accumulator 142d is arranged in fluid communication with the second longitudinal hydraulic line 132b at a location between the compression chamber port 130b of the back right damper 102d and the back right bridge hydraulic line 140d. Each of the accumulators 142a, 142b, 142c, 142d have a variable fluid volume that increases and decreases depending on the fluid pressure in the first and second longitudinal hydraulic lines 132a, 132b. It should be appreciated that the accumulators 142a, 142b, 142c, 142d may be constructed in a number of different ways. For example and without limitation, the accumulators 142a, 142b, 142c, 142d may have accumulation chambers and pressurized gas chambers that are separated by floating pistons or flexible membranes.

The suspension system 100 also includes six electromechanical comfort valves 144a, 144b, 144c, 144d, 146a, 146b that are connected in-line (i.e., in series) with each of the bridge hydraulic lines 140a, 140b, 140c, 140d and each of the longitudinal hydraulic lines 132a, 132b. A front left comfort valve 144a is positioned in the front left bridge hydraulic line 140a. A front right comfort valve 144b is positioned in the front right bridge hydraulic line 140b. A back left comfort valve 144c is positioned in the back left bridge hydraulic line 140c. A back right comfort valve 144d is positioned in the back right bridge hydraulic line 140d. A first longitudinal comfort valve 146a is positioned in the first longitudinal hydraulic line 132a between the front and rear hydraulic lines 134a, 136a of the first hydraulic circuit 120a. A second longitudinal comfort valve 146b is positioned in the second longitudinal hydraulic line 132b between the front and rear hydraulic lines 134b, 136b of the second hydraulic circuit 120b. In the illustrated example, the comfort valves 144a, 144b, 144c, 144d and the longitudinal comfort valves 146a, 146b are semi-active electro-mechanical valves with a combination of passive spring-disk elements and a solenoid. The comfort valves 144a, 144b, 144c, 144d and the longitudinal comfort valves 146a, 146b are electronically connected to the suspension control module 123, which is configured to supply electrical current to the solenoids of the comfort valves 144a, 144b, 144c, 144d and the longitudinal comfort valves 146a, 146b to selectively and individually open and close the comfort valves 144a, 144b, 144c, 144d and the longitudinal comfort valves 146a, 146b.

The first pressure sensor 124a of the manifold assembly 104 is arranged to measure fluid pressure in the first manifold hydraulic line 138a and the second pressure sensor 124b of the manifold assembly 104 is arranged to measure fluid pressure in the second manifold hydraulic line 138b. When the vehicle is cornering, braking, or accelerating, the lateral and longitudinal acceleration is measured by one or more accelerometers (not shown) and the anti-roll torque to control the roll of the vehicle is calculated by the suspension control module 123. Alternatively, the lateral and longitudinal acceleration of the vehicle can be computed by the suspension control module 123 based on a variety of different inputs, including without limitation, steering angle, vehicle speed, brake pedal position, and/or accelerator pedal position. The dampers 102a, 102b, 102c, 102d are used to provide forces that counteract the roll moment induced by the lateral acceleration, thus reducing the roll angle of the vehicle.

When the first and second manifold valves 122a, 122b are closed, the first and second hydraulic circuits 120a, 120b operate as a closed loop system, either together or separately depending on the open or closed status of the electro-mechanical comfort valves 144a, 144b, 144c, 144d and the longitudinal comfort valves 146a, 146b. When the first and/or second manifold valves 122a, 122b are open, the bi-directional pump 110 either adds or removes fluid from the first and/or second hydraulic circuits 120a, 120b. As will be explained in greater detail below, the suspension system 100 can control the roll stiffness of the vehicle, which changes the degree to which the vehicle will lean to one side or the other during corning (i.e., roll)

For example, when the vehicle is put into a right-hand turn, the momentum of the sprung weight of the vehicle tends to make the vehicle lean left towards the outside of the turn, compressing the front left damper 102a and the back left damper 102c. When this occurs, fluid flows out from the first compression chamber 126a of the front left damper 102a and the third compression chamber 126c of the back left damper 102c into the first longitudinal hydraulic line 132a of the first hydraulic circuit 120a. As a result of the weight transfer to the left side of the vehicle, the front right damper 102b and back right damper 102d begin to extend, causing fluid to flow out of the second rebound chamber 128b of the front right damper 102b and the fourth rebound chamber 128d of the back right damper 102d into the front and rear hydraulic lines 134a, 136a of the first hydraulic circuit 120a. When the comfort valves 144a, 144b, 144c, 144d are closed, the fluid flow out of the first compression chamber 126a of the front left damper 102a, out of the third compression chamber 126c of the back left damper 102c, out of the second rebound chamber 128b of the front right damper 102b, and out of the fourth rebound chamber 128d of the back right damper 102d and into the front and rear hydraulic lines 134a, 136a of the first hydraulic circuit 120a increases the pressure in the front left and back left accumulators 142a, 142c, thus providing a passive roll resistance where it becomes increasingly more difficult to compress the front left damper 102a and the back left damper 102c since the first compression chamber 126a of the front left damper 102a and the third compression chamber 126c of the back left damper 102c are connected in fluid communication with the first hydraulic circuit 120a. At the same time, fluid flows out of front right and back right accumulators 142b, 142d and into the first rebound chamber 128a of the front left damper 102a, into the third rebound chamber 128c of the back left damper 102c, into the second compression chamber 126b of the front right damper 102b, and into the fourth compression chamber 126d of the back right damper 102d. The resulting pressure difference between the dampers 102a, 102b, 102c, 102d generates damper forces that counteract or resist the roll moment of the vehicle. Additional roll resistance can be added by opening the first manifold valve 122a as the bi-directional pump 110 is running in a first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the first hydraulic circuit 120a when the first manifold valve 122a is open.

The opposite is true when the vehicle is put into a left-hand turn, where the momentum of the sprung weight of the vehicle tends to make the vehicle lean right towards the outside of the turn, compressing the front right damper 102b and the back right damper 102d. When this occurs, fluid flows out from the second compression chamber 126b of the front right damper 102b and the fourth compression chamber 126d of the back right damper 102d into the second longitudinal hydraulic line 132b of the second hydraulic circuit 120b. As a result of the weight transfer to the right side of the vehicle, the front left damper 102a and back left damper 102c begin to extend, causing fluid to flow out of the first rebound chamber 128a of the front left damper 102a and the third rebound chamber 128c of the back left damper 102c into the front and rear hydraulic lines 134b, 136b of the second hydraulic circuit 120b. When the comfort valves 144a, 144b, 144c, 144d are closed, the fluid flow out of the second compression chamber 126b of the front right damper 102b, out of the fourth compression chamber 126d of the back right damper 102d, out of the first rebound chamber 128a of the front left damper 102a, and out of the third rebound chamber 128c of the back left damper 102c and into the front and rear hydraulic lines 134b, 136b of the second hydraulic circuit 120b increases the pressure in the front right and back right accumulators 142b, 142d, thus providing a passive roll resistance where it becomes increasingly more difficult to compress the front right damper 102b and the back right damper 102d since the second compression chamber 126b of the front right damper 102b and the fourth compression chamber 126d of the back right damper 102d are connected in fluid communication with the second hydraulic circuit 120b. At the same time, fluid flows out of front left and back left accumulators 142a, 142c and into the second rebound chamber 128b of the front right damper 102b, into the fourth rebound chamber 128d of the back right damper 102d, into the first compression chamber 126a of the front left damper 102a, and into the third compression chamber 126c of the back left damper 102c. The resulting pressure difference between the dampers 102a, 102b, 102c, 102d generates damper forces that counteract or resist the roll moment of the vehicle. Additional roll resistance can be added by opening the second manifold valve 122b as the bi-directional pump 110 is running in the first direction where the bi-directional pump 110 draws in hydraulic fluid from the reservoir hydraulic line 118 and discharges hydraulic fluid into the pump hydraulic line 108 to produce a positive pressure in the pump hydraulic line 108, which increases fluid pressure in the second hydraulic circuit 120b when the second manifold valve 122b is open.

It should also be appreciated that during cornering, the roll stiffness of the front dampers 102a, 102b can be coupled or de-coupled from the roll stiffness of the rear dampers 102c, 102d by opening and closing the first and/or second longitudinal comfort valves 146a, 146b. For example, the roll stiffness of the front left damper 102a and the back left damper 102c will be coupled when the first longitudinal comfort valve 146a is open and decoupled when the first longitudinal comfort valve 146a is closed. Similarly, the roll stiffness of the front right damper 102b and the back right damper 102d will be coupled when the second longitudinal comfort valve 146b is open and decoupled when the second longitudinal comfort valve 146b is closed.

When roll stiffness is not required, the comfort valves 144a, 144b, 144c, 144d and the longitudinal comfort valves 146a, 146b can be opened to enhance the ride comfort of the suspension system 100 and reduce or eliminate unwanted suspension movements resulting from the hydraulic coupling of one damper of the system to another damper of the system (e.g., where the compression of one damper causes movement and/or a dampening change in another damper). For example, when the front left comfort valve 144a is open and the front left damper 102a undergoes a compression stroke as the front left wheel hits a bump, fluid may flow from the first compression chamber 126a of the front left damper 102a, into the first longitudinal hydraulic line 132a, from the first longitudinal hydraulic line 132a to the front hydraulic line 134b of the second hydraulic circuit 120b by passing through the front left bridge hydraulic line 140a and the front left comfort valve 144a, and into the first rebound chamber 128a of the front left damper 102a. Thus, fluid can travel from the first compression chamber 126a to the first rebound chamber 128a of the front left damper 102a with the only restriction coming from the dampening valves in the rebound and compression chamber ports 130a, 130b of the front left damper 102a. As such, when all of the comfort valves 144a, 144b, 144c, 144d and the longitudinal comfort valves 146a, 146b are open, the dampers 102a, 102b, 102c, 102d are effectively decoupled from one another for improved ride comfort. It should also be appreciated that to return the suspension system 100 to this "comfort mode" of operation, the first and/or second manifold valves 122a, 122b may be opened while the bi-directional pump 110 is running in a second direction where the bi-directional pump 110 draws in hydraulic fluid from the pump hydraulic line 108 and discharges hydraulic fluid into the reservoir hydraulic line 118 to produce a negative pressure in the pump hydraulic line 108 that reduces fluid pressure in the first and/or second hydraulic circuits 120a, 120b.

Figure 2:
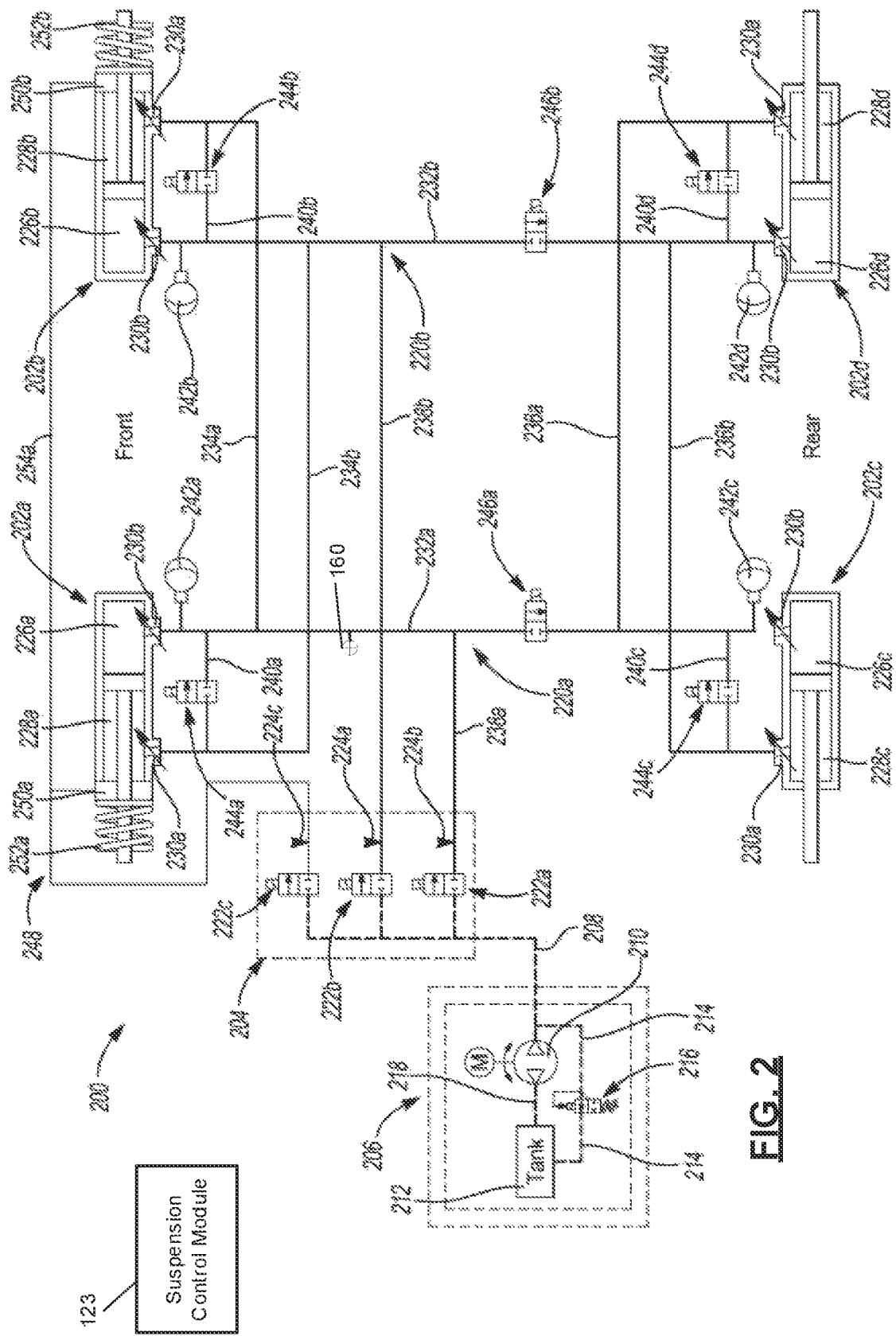
FIG. 2 is a schematic diagram illustrating an example suspension system that includes two comfort valves that open and close the hydraulic lines connecting the two front dampers to the two rear dampers of the system and a separate hydraulic lifting circuit for the two front dampers.

FIG. 2 illustrates another suspension system 200 that shares many of the same components as the suspension system 100 illustrated in FIG. 1, but in FIG. 2 a front axle lift assembly 248 has been added. Rather than repeat the description set forth above, the following paragraphs describe the structure and function of the components in FIG. 2 that are new and/or different from those shown and described in connection with FIG. 1. It should be appreciated that the reference numbers in FIG. 1 are "100" series numbers (e.g., 100, 102, 104, etc.) whereas the components in FIG. 2 that are the same or similar to the components of the suspension system 100 shown in FIG. 1 share the same base reference numbers, but are listed as "200" series numbers (e.g., 200, 202, 204, etc.). Thus, the same description for element 100 above applies to element 200 in FIG. 2 and so on and so forth.

The front axle lift assembly 248 illustrated in FIG. 2 includes a front left lifter 250a on the front left damper 202a and a front right lifter 250b on the front right damper 202b. Although other configurations are possible, in the illustrated example, the front left damper 202a and the front right damper 202b include a front left coil spring 252a and a front right coil spring 252b, respectively, that extend co-axially and helically about the piston rods of the front dampers 202a, 202b in a coil-over arrangement. The front lifters 250a, 250b are positioned between the front coils springs 252a, 252b and the first and second rebound chambers 228a, 228b of the front dampers 202a, 202b and extend co-axially and annularly about the piston rods. The manifold assembly 204 further includes a third manifold valve 222c that is connected in fluid communication with the pump hydraulic line 208. A front axle lift hydraulic line 254a extends between and is fluidly connected to the third manifold valve 222c with the front left lifter 250a and the front right lifter 250b. A third pressure sensor 224c is arranged to monitor the fluid pressure in the front axle lift hydraulic line 254a. Each front lifter 250a, 250b is axially expandable such that an increase in fluid pressure inside the front lifters 250a, 250b causes the front lifters 250a, 250b to urge the front coil springs 252a, 252b away from the first and second rebound chambers 228a, 228b of the front dampers 202a, 202b, which operates to lift (i.e., raise) the front of the vehicle, increasing the ride height. To activate the front axle lift assembly 248, the suspension control module 123 opens the third manifold valve 222c when the bi-directional pump 210 is running in the first direction where the bi-directional pump 210 draws in hydraulic fluid from the reservoir hydraulic line 218 and discharges hydraulic fluid into the pump hydraulic line 208 to produce a positive pressure in the pump hydraulic line 208, which increases fluid pressure in the front axle lift hydraulic line 254a and thus the front lifters 250a, 250b. Once a desired lift position is achieved, the controller closes the third manifold valve 222c. It should therefore be appreciated that the front axle lift assembly 248 can be used to provide improved ground clearance during off-road operation or to give low riding vehicles improved ground clearance when traversing speed bumps. To deactivate the front axle lift assembly 248, the suspension control module 123 opens the third manifold valve 222c when the bi-directional pump 210 is running in the second direction where the bi-directional pump 210 draws in hydraulic fluid from the pump hydraulic line 208 and discharges hydraulic fluid into the reservoir hydraulic line 218 to produce a negative pressure in the pump hydraulic line 208 that reduces fluid pressure in the front axle lift hydraulic line 254a to lower the front of the vehicle back down to an unlifted position.

Figure 3:
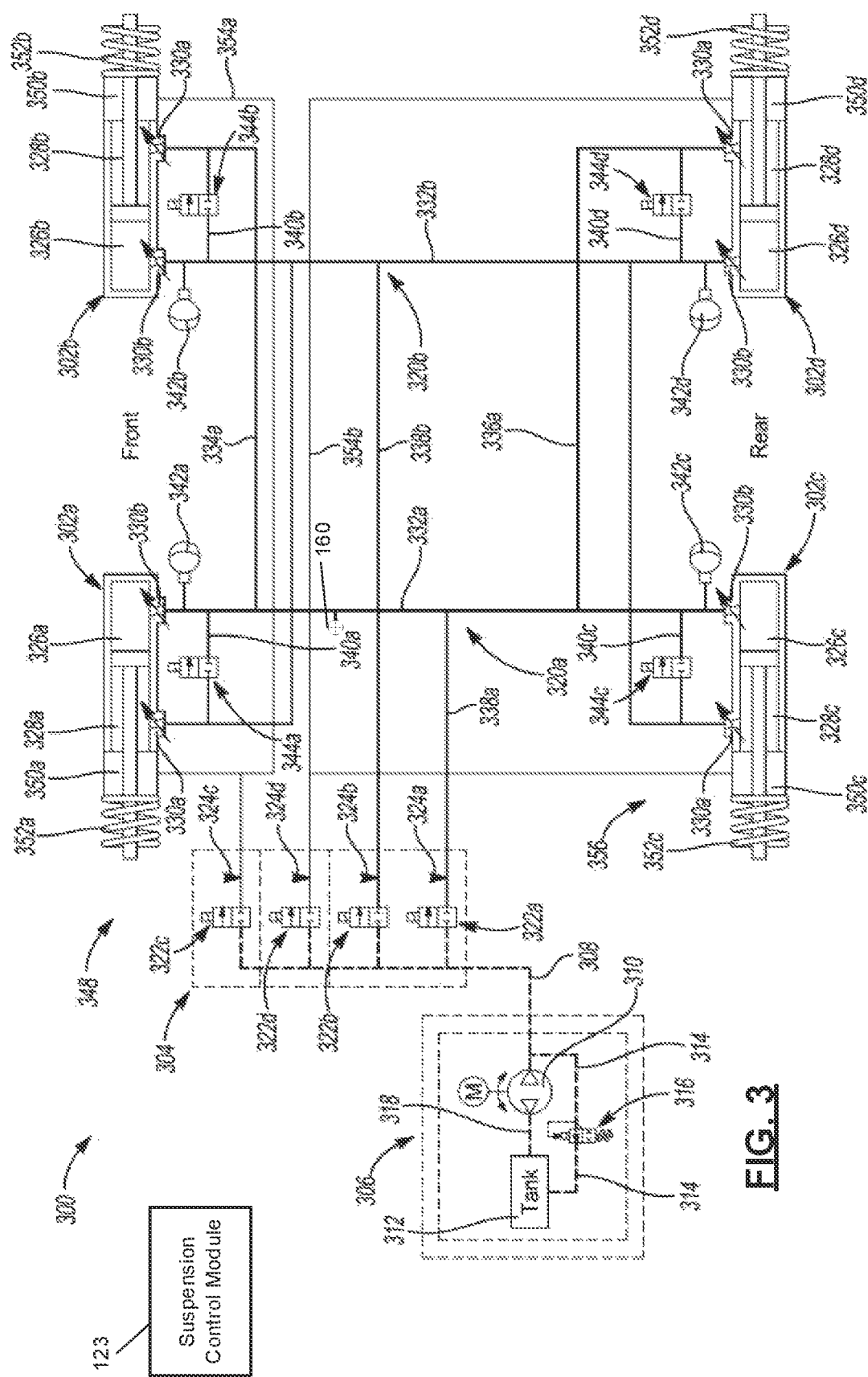
FIG. 3 is a schematic diagram illustrating an example suspension system that includes two comfort valves that open and close the hydraulic lines connecting the two front dampers to the two rear dampers of the system and two separate hydraulic lifting circuits for the two front dampers and the two rear dampers.

FIG. 3 illustrates another suspension system 300 that shares many of the same components as the suspension systems 100, 200 illustrated in FIGS. 1 and 2, but in FIG. 3 a rear axle lift assembly 356 has been added. Rather than repeat the description set forth above, the following paragraphs describe the structure and function of the components in FIG. 3 that are new and/or different from those shown and described in connection with FIGS. 1 and 2. It should be appreciated that the reference numbers in FIG. 1 are "100" series numbers (e.g., 100, 102, 104, etc.) and the reference numbers in FIG. 2 are "200" series numbers (e.g., 200, 202, 204, etc.) whereas the components in FIG. 3 that are the same or similar to the components of the suspension systems 100, 200 shown in FIGS. 1 and 2 share the same base reference numbers, but are listed as "300" series numbers (e.g., 300, 302, 304, etc.). Thus, the same description for elements 100 and 200 above applies to element 300 in FIG. 3 and so on and so forth.

The rear axle lift assembly 356 illustrated in FIG. 3 includes a back left lifter 350c on the back left damper 302c and a back right lifter 350d on the back right damper 302d. Although other configurations are possible, in the illustrated example, the back left damper 302c and the back right damper 302d include a back left coil spring 352c and a back right coil spring 352d, respectively, that extend co-axially and helically about the piston rods of the back dampers 302c, 302d in a coil-over arrangement. The back lifters 350c, 350d are positioned between the back coils springs 352c, 352d and the third and fourth rebound chambers 328c, 328d of the back dampers 302a, 302b and extend co-axially and annularly about the piston rods. The manifold assembly 304 further includes a fourth manifold valve 322d that is connected in fluid communication with the pump hydraulic line 308. A rear axle lift hydraulic line 354b extends between and is fluidly connected to the fourth manifold valve 322d with the back left lifter 350c and the back right lifter 350d. A fourth pressure sensor 324d is arranged to monitor the fluid pressure in the rear axle lift hydraulic line 354b. Each back lifter 350c, 350d is axially expandable such that an increase in fluid pressure inside the back lifters 350c, 350d causes the back lifters 350c, 350d to urge the back coil springs 352c, 352d away from the third and fourth rebound chambers 328c, 328d of the back dampers 302c, 302d, which operates to lift (i.e., raise) the back/rear of the vehicle, increasing the ride height. To activate the rear axle lift assembly 356, the suspension control module 123 opens the fourth manifold valve 322d when the bi-directional pump 310 is running in the first direction where the bi-directional pump 310 draws in hydraulic fluid from the reservoir hydraulic line 318 and discharges hydraulic fluid into the pump hydraulic line 308 to produce a positive pressure in the pump hydraulic line 308, which increases fluid pressure in the rear axle lift hydraulic line 354b and thus the back lifters 350c, 350d. Once a desired lift position is achieved, the suspension control module 123 closes the fourth manifold valve 322d. It should therefore be appreciated that the rear axle lift assembly 356 can be used in combination with the front axle lift assembly 348 (also described above in connection with FIG. 2) to provide improved ground clearance during off-road operation or to give low riding vehicles improved ground clearance when traversing speed bumps. To deactivate the rear axle lift assembly 356, the suspension control module 123 opens the fourth manifold valve 322d when the bi-directional pump 310 is running in the second direction where the bi-directional pump 310 draws in hydraulic fluid from the pump hydraulic line 308 and discharges hydraulic fluid into the reservoir hydraulic line 318 to produce a negative pressure in the pump hydraulic line 308 that reduces fluid pressure in the rear axle lift hydraulic line 354b to lower the rear of the vehicle back down to an unlifted position.

Figure 4:
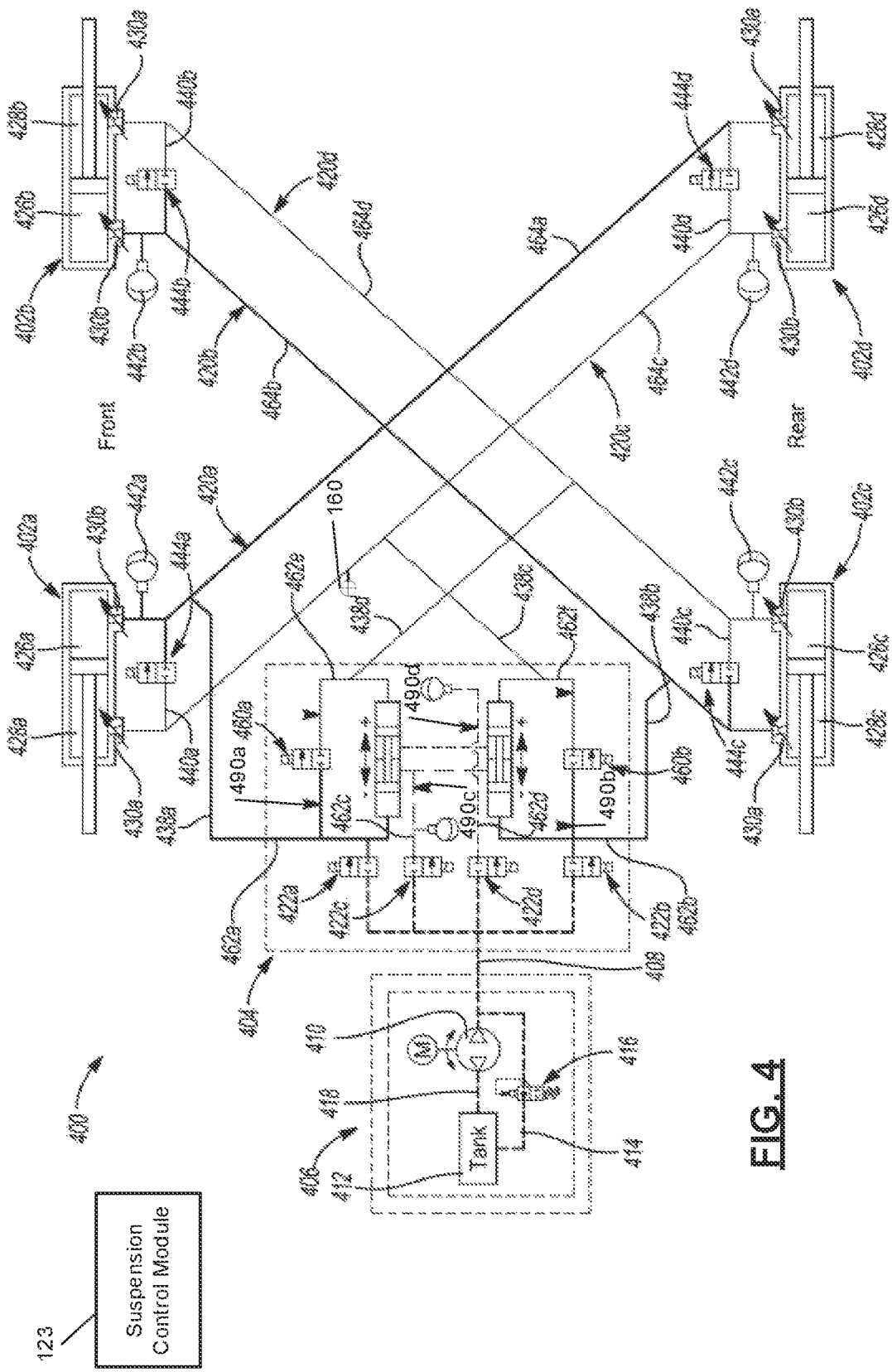
FIG. 4 is a schematic diagram illustrating an example suspension system that includes four hydraulic circuits connecting the front and rear dampers and an example comfort valve equipped manifold assembly.

With reference to FIG. 4, another suspension system 400 is illustrated that shares many of the same components as the suspension system 100 illustrated in FIG. 1. Rather than repeat the description set forth above, the following paragraphs describe the structure and function of the components in FIG. 4 that are new and/or different from those shown and described in connection with FIG. 1. It should be appreciated that the reference numbers in FIG. 1 are "100" series numbers (e.g., 100, 102, 104, etc.) whereas the components in FIG. 4 that are the same or similar to the components of the suspension system 100 shown in FIG. 1 share the same base reference numbers, but are listed as "400" series numbers (e.g., 400, 402, 404, etc.). Thus, the same description for element 100 above applies to element 400 in FIG. 4 and so on and so forth.

The suspension system 400 in FIG. 4 also includes a front left damper 402a, a front right damper 402b, a back left damper 402c, and a back right damper 402d. The suspension system 400 also includes a manifold assembly 404 that is connected in fluid communication with a pump assembly 406 by a pump hydraulic line 408. Like in FIG. 1, the pump assembly 406 includes a bi-directional pump 410, a hydraulic reservoir 412 (e.g., a tank), and a bypass hydraulic line 414 that can be open and closed by a pressure relief valve 416.

The manifold assembly 404 is connected in fluid communication with the front and rear dampers 402a, 402b, 402c, 402d by four hydraulic circuits 420a, 420b, 420c, 420d: a first hydraulic circuit 420a, a second hydraulic circuit 420b, a third hydraulic circuit 420c, and a fourth hydraulic circuit 420d. The manifold assembly 404 includes four manifold valves 422a, 422b, 422c, 422d (a first manifold valve 422a, a second manifold valve 422b, a third manifold valve 422c, and a fourth manifold valve 422d) that are connected in parallel with the pump hydraulic line 408. The manifold assembly 404 further includes a first manifold comfort valve 460a, a second manifold comfort valve 460b, and six manifold conduits 462a, 462b, 462c, 462d, 462e, 462f: a first manifold conduit 462a, a second manifold conduit 462b, a third manifold conduit 462c, a fourth manifold conduit 462d, a fifth manifold conduit 462e, and a sixth manifold conduit 462f. The first manifold conduit 462a is connected in fluid communication with the first manifold valve 422a and the first manifold comfort valve 460a while the second manifold conduit 462b is connected in fluid communication with the second manifold valve 422b and the second manifold comfort valve 460b. The third manifold conduit 462c is connected in fluid communication with the third manifold valve 422c and the fourth manifold conduit 462d is connected in fluid communication with the fourth manifold valve 422d. The fifth manifold conduit 462e is connected in fluid communication with the first manifold comfort valve 460a and the sixth manifold conduit 462f is connected in fluid communication with the second manifold comfort valve 460b. Additional structure and operational details of the manifold assembly 404 is described below in connection with FIG. 5; however, it should be appreciated from FIG. 4 that fluid pressure in the four hydraulic circuits 420a, 420b, 420c, 420d operates to dynamically adjust the roll and pitch stiffness of the vehicle and can be used to either augment or completely replace mechanical stabilizer bars/anti-roll bars. Such mechanical systems require relatively straight, unobstructed runs between each of the front dampers 402a, 402b and each of the back dampers 402c, 402d. Accordingly, the suspension system 400 disclosed herein offers packaging benefits because the dampers 402a, 402b, 402c, 402d only need to be hydraulically connected to the manifold assembly 404.

The first hydraulic circuit 420a includes a first cross-over hydraulic line 464a that extends between and fluidly connects the compression chamber port 430b (to the first compression chamber 426a) of the front left damper 402a and the rebound chamber port 430a (to the fourth rebound chamber 428d) of the back right damper 402d. The first hydraulic circuit 420a also includes a first manifold hydraulic line 438a that extends between and fluidly connects the first cross-over hydraulic line 464a and the first manifold conduit 462a. The second hydraulic circuit 420b includes a second cross-over hydraulic line 464b that extends between and fluidly connects the compression chamber port 430b (to the second compression chamber 426b) of the front right damper 402b and the rebound chamber port 430a (to the third rebound chamber 428c) of the back left damper 402c. The second hydraulic circuit 420b also includes a second manifold hydraulic line 438b that extends between and fluidly connects the second cross-over hydraulic line 464b and the second manifold conduit 462b. The third hydraulic circuit 420c includes a third cross-over hydraulic line 464c that extends between and fluidly connects the rebound chamber port 430a (to the first rebound chamber 428a) of the front left damper 402a and the compression chamber port 430b (to the fourth compression chamber 426d) of the back right damper 402d. The third hydraulic circuit 420c also includes a third manifold hydraulic line 438c that extends between and fluidly connects the third cross-over hydraulic line 464c and the sixth manifold conduit 462f. The fourth hydraulic circuit 420d includes a fourth cross-over hydraulic line 464d that extends between and fluidly connects the rebound chamber port 430a (to the second rebound chamber 428b) of the front right damper 402b and the compression chamber port 430b (to the third compression chamber 426c) of the back left damper 402c. The fourth hydraulic circuit 420d also includes a fourth manifold hydraulic line 438d that extends between and fluidly connects the fourth cross-over hydraulic line 464d and the fifth manifold conduit 462e. It should be appreciated that the word "cross-over" as used in the first, second, third, and fourth cross-over hydraulic lines 464a, 464b, 464c, 464d simply means that the first, second, third, and fourth cross-over hydraulic lines 464a, 464b, 464c, 464d run between dampers 402a, 402b, 402c, 402d at opposite corners of the vehicle (e.g., front left to back right and front right to back left). The first, second, third, and fourth cross-over hydraulic lines 464a, 464b, 464c, 464d need not be linear or arranged in any particular direction as long as they ultimately connect dampers 402a, 402b, 402c, 402d positioned at opposite corners of the vehicle.

The suspension system 400 also includes four bridge hydraulic lines 440a, 440b, 440c, 440d that fluidly couple the first and third hydraulic circuits 420a, 420c and the second and fourth hydraulic circuits 420b, 420d to one another. The four bridge hydraulic lines 440a, 440b, 440c, 440d include a front left bridge hydraulic line 440a that extends between and fluidly connects the first cross-over hydraulic line 464a and the third cross-over hydraulic line 464c, a front right bridge hydraulic line 440b that extends between and fluidly connects the second cross-over hydraulic line 464b and the fourth cross-over hydraulic line 464d, a back left bridge hydraulic line 440c that extends between and fluidly connects the second cross-over hydraulic line 464b and the fourth cross-over hydraulic line 464d, and a back right bridge hydraulic line 440d that extends between and fluidly connects the first cross-over hydraulic line 464a and the third cross-over hydraulic line 464c.

The front left bridge hydraulic line 440a is connected to the first cross-over hydraulic line 464a between the compression chamber port 430b of the front left damper 402a and the first manifold hydraulic line 438a and is connected to the third cross-over hydraulic line 464c between the rebound chamber port 430a of the front left damper 402a and the third manifold hydraulic line 438c. The front right bridge hydraulic line 440b is connected to the second cross-over hydraulic line 464b between the compression chamber port 430b of the front right damper 402b and the second manifold hydraulic line 438b and is connected to the fourth cross-over hydraulic line 464d between the rebound chamber port 430a of the front right damper 402b and the fourth manifold hydraulic line 438d. The back left bridge hydraulic line 440c is connected to the second cross-over hydraulic line 464b between the rebound chamber port 430a of the back left damper 402c and the second manifold hydraulic line 438b and is connected to the fourth cross-over hydraulic line 464d between the compression chamber port 430b of the back left damper 402c and the fourth manifold hydraulic line 438d. The back right bridge hydraulic line 440d is connected to the first cross-over hydraulic line 464a between the rebound chamber port 430a of the back right damper 402d and the first manifold hydraulic line 438a and is connected to the third cross-over hydraulic line 464c between the compression chamber port 430b of the back right damper 402d and the third manifold hydraulic line 438c. In the illustrated example, the various hydraulic lines are made of flexible tubing (e.g., hydraulic hoses), but it should be appreciated that other conduit structures and/or fluid passageways can be used.

A front left accumulator 442a is arranged in fluid communication with the first cross-over hydraulic line 464a at a location between the compression chamber port 430b of the front left damper 402a and the front left bridge hydraulic line 440a. A front right accumulator 442b is arranged in fluid communication with the second cross-over hydraulic line 464b at a location between the compression chamber port 430b of the front right damper 402b and the front right bridge hydraulic line 440b. A back left accumulator 442c is arranged in fluid communication with the fourth cross-over hydraulic line 464d at a location between the compression chamber port 430b of the back left damper 402c and the back left bridge hydraulic circuit 420c. A back right accumulator 442d is arranged in fluid communication with the third cross-over hydraulic line 464c at a location between the compression chamber port 430b of the back right damper 402d and the back right bridge hydraulic line 440d. Each of the accumulators 442a, 442b, 442c, 442d have a variable fluid volume that increases and decreases depending on the fluid pressure in the first and second longitudinal hydraulic lines 432a, 432b. It should be appreciated that the accumulators 442a, 442b, 442c, 442d may be constructed in a number of different ways. For example and without limitation, the accumulators 442a, 442b, 442c, 442d may have accumulation chambers and pressurized gas chambers that are separated by floating pistons or flexible membranes.

The suspension system 400 also includes four electromechanical comfort valves 444a, 444b, 444c, 444d that are connected in-line (i.e., in series) with each of the bridge hydraulic lines 440a, 440b, 440c, 440d. A front left comfort valve 444a is positioned in the front left bridge hydraulic line 440a. A front right comfort valve 444b is positioned in the front right bridge hydraulic line 440b. A back left comfort valve 444c is positioned in the back left bridge hydraulic line 440c. A back right comfort valve 444d is positioned in the back right bridge hydraulic line 440d. In the illustrated example, the four comfort valves 444a, 444b, 444c, 444d and the two manifold comfort valves 460a, 460b are semi-active electro-mechanical valves with a combination of passive spring-disk elements and a solenoid. The comfort valves 444a, 444b, 444c, 444d and the two manifold comfort valves 460a, 460b are electronically connected to the suspension control module 123, which is configured to supply electrical current to the solenoids of the comfort valves 444a, 444b, 444c, 444d and the two manifold comfort valves 460a, 460b to selectively and individually open and close the comfort valves 444a, 444b, 444c, 444d and the two manifold comfort valves 460a, 460b.

When the manifold valves 422a, 422b, 422c, 422d are closed, the hydraulic circuits 420a, 420b, 420c, 420d operate as a closed loop system, either together or separately depending on the open or closed status of the comfort valves 444a, 444b, 444c, 444d and manifold comfort valves 460a, 460b. When the manifold valves 422a, 422b, 422c, 422d are open, the bi-directional pump 110 either adds or removes fluid from one or more of the hydraulic circuits 420a, 420b, 420c, 420d. There are three primary types of suspension movements that the illustrated suspension system 400 can control either passively (i.e., as a closed loop system) or actively (i.e., as an open loop system) by changing or adapting the roll and/or pitch stiffness of the vehicle: leaning to one side or the other during cornering (i.e., roll) pitching forward during braking (i.e., brake dive), and pitching aft during acceleration (i.e., rear end squat). Descriptions of how the suspension system 400 reacts to each of these conditions are provided below.

When the vehicle is put into a right-hand turn, the momentum of the sprung weight of the vehicle tends to make the vehicle lean left towards the outside of the turn, compressing the front left damper 402a and the back left damper 402c. When this occurs, fluid flows out from the first compression chamber 426a of the front left damper 402a and the third compression chamber 426c of the back left damper 402c into the first and fourth cross-over hydraulic lines 464a, 464d. As a result of the weight transfer to the left side of the vehicle, the front right damper 402b and back right damper 402d begin to extend, causing fluid to flow out of the second rebound chamber 428b of the front right damper 402b and the fourth rebound chamber 428d of the back right damper 402d into the first and fourth cross-over hydraulic lines 464a, 464d. When the comfort valves 444a, 444b, 444c, 444d are closed, the fluid flow out of the first compression chamber 426a of the front left damper 402a, out of the third compression chamber 426c of the back left damper 402c, out of the second rebound chamber 428b of the front right damper 402b and out of the fourth rebound chamber 428d of the back right damper 402d and into the first and fourth cross-over hydraulic lines 464a, 464d increases the pressure in the front left and back left accumulators 442b, 442d, thus providing a passive roll resistance where it becomes increasingly more difficult to compress the front left damper 402a and the back left damper 402c since the first compression chamber 426a of the front left damper 402a and the third compression chamber 426c of the back left damper 402c are connected in fluid communication with the first and fourth hydraulic circuits 420a, 420d. At the same time, fluid flows out of front left and back left accumulators 442b, 442d and into the first rebound chamber 428a of the front left damper 402a, into the third rebound chamber 428c of the back left damper 402c, into the second compression chamber 426b of the front right damper 402b, and into the fourth compression chamber 426d of the back right damper 402d. The resulting pressure difference between the dampers 402a, 402b, 402c, 402d generates damper forces that counteract or resist the roll moment of the vehicle. Additional roll resistance can be added by opening the first manifold valve 422a and the first manifold comfort valve 460a as the bi-directional pump 410 is running in a first direction where the bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the first and fourth hydraulic circuits 420a, 420d.

The opposite is true when the vehicle is put into a left-hand turn, where the momentum of the sprung weight of the vehicle tends to make the vehicle lean right towards the outside of the turn, compressing the front right damper 402b and the back right damper 402d. When this occurs, fluid flows out from the second compression chamber 426b of the front right damper 402b and the fourth compression chamber 426d of the back right damper 402d into the second and third cross-over hydraulic lines 464b, 464c. As a result of the weight transfer to the right side of the vehicle, the front left damper 402a and back left damper 402c begin to extend, causing fluid to flow out of the first rebound chamber 428a of the front left damper 402a and the third rebound chamber 428c of the back left damper 402c into the second and third cross-over hydraulic lines 464b, 464c. When the comfort valves 444a, 444b, 444c, 444d are closed, the fluid flow out of the second compression chamber 426b of the front right damper 402b, out of the fourth compression chamber 426d of the back right damper 402d, out of the first rebound chamber 428a of the front left damper 402a, and out of the third rebound chamber 428c of the back left damper 402c and into the second and third cross-over hydraulic lines 464b, 464c increases the pressure in the front right and back right accumulators 142b, 142d, thus providing a passive roll resistance where it becomes increasingly more difficult to compress the front right damper 402b and the back right damper 402d since the second compression chamber 426b of the front right damper 402b and the fourth compression chamber 426d of the back right damper 402d are connected in fluid communication with the second and third hydraulic circuits 420b, 420c. At the same time, fluid flows out of front right and back right accumulators 442a, 442c and into the second rebound chamber 428b of the front right damper 402b, into the fourth rebound chamber 428d of the back right damper 402d, into the first compression chamber 426a of the front left damper 402a, and into the third compression chamber 426c of the back left damper 402c. The resulting pressure difference between the dampers 402a, 402b, 402c, 402d generates damper forces that counteract or resist the roll moment of the vehicle. Additional roll resistance can be added by opening the second manifold valve 422b and the second manifold comfort valve 460b as the bi-directional pump 410 is running in the first direction where the bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the second and third hydraulic circuits 420b, 420c.

During braking, the momentum of the sprung weight of the vehicle tends to make the vehicle pitch or dive forward, compressing the front left damper 402a and the front right damper 402b. When this occurs, fluid flows out from the first compression chamber 426a of the front left damper 402a into the first cross-over hydraulic line 464a and out from the second compression chamber 426b of the front right damper 402b into the second cross-over hydraulic line 464b. As a result of the weight transfer to the front of the vehicle, the back left damper 402c and back right damper 402d begin to extend, causing fluid to flow out of the third rebound chamber 428c of the back left damper 402c into the second cross-over hydraulic line 464b and out of the fourth rebound chamber 428d of the back right damper 402d into the first cross-over hydraulic line 464a. With the front left, front right, back left, and back right comfort valves 444a, 444b, 444c, 444d and the first and second manifold comfort valves 460a, 460b all closed, the fluid flow out of the third rebound chamber 428c of the back left damper 402c and the fourth rebound chamber 428d of the back right damper 402d into the first and second cross-over hydraulic lines 464a, 464b increases the pressure in the front left and front right accumulators 442a, 442b, thus providing a passive pitch resistance where it becomes increasingly more difficult to compress the front left damper 402a and the front right damper 402b since the first compression chamber 426a of the front left damper 402a and the second compression chamber 426b of the front right damper 402b are connected in fluid communication with the first and second hydraulic circuits 420a, 420b.

During acceleration, the momentum of the sprung weight of the vehicle tends to make the vehicle pitch or squat rearward (i.e., aft), compressing the back left damper 402c and the back right damper 402d. When this occurs, fluid flows out from the third compression chamber 426c of the back left damper 402c into the fourth cross-over hydraulic line 464d and out of the fourth compression chamber 426d of the back right damper 402d into the third cross-over hydraulic line 464c. As a result of the weight transfer to the back/rear of the vehicle, the front left damper 402a and front right damper 402b begin to extend, causing fluid to flow out of the first rebound chamber 428a of the front left damper 402a into the third cross-over hydraulic line 464c and out of the second rebound chamber 428b of the front right damper 402b into the fourth cross-over hydraulic line 464d. With the front left, front right, back left, and back right comfort valves 444a, 444b, 444c, 444d and the first and second manifold comfort valves 460a, 460b all closed, the fluid flow out of the first rebound chamber 428a of the front left damper 402a and the second rebound chamber 428b of the front right damper 402b into the third and fourth cross-over hydraulic lines 464c, 464d increases the pressure in the back left and back right accumulators 442c, 442d, thus providing a passive pitch resistance where it becomes increasingly more difficult to compress the back left damper 402c and the back right damper 402d since the third compression chamber 426c of the back left damper 402c and the fourth compression chamber 426d of the back right damper 402d are connected in fluid communication with the third and fourth hydraulic circuits 420c, 420d.

When active or passive roll and/or pitch stiffness is not required, the four comfort valves 444a, 444b, 444c, 444d and the two manifold comfort valves 460a, 460b can be opened to enhance the ride comfort of the suspension system 400 and reduce or eliminate unwanted suspension movements resulting from the hydraulic coupling of one damper of the system to another damper of the system (e.g., where the compression of one damper causes movement and/or a dampening change in another damper). For example, when the front left comfort valve 444a is open and the front left damper 402a undergoes a compression stroke as the front wheel hits a bump, fluid may flow from the first compression chamber 426a of the front left damper 402a, into the first cross-over hydraulic line 464a, from the first cross-over hydraulic line 464a to the third cross-over hydraulic line 464c by passing through the front left bridge hydraulic line 440a and the front left comfort valve 444a, and into the first rebound chamber 428a of the front left damper 402a. Thus, fluid can travel from the first compression chamber 426a to the first rebound chamber 428a of the front left damper 402a with the only restriction coming from the dampening valves in the rebound and compression chamber ports 430a, 430b of the front left damper 402a. As such, when all of the comfort valves 444a, 444b, 444c, 444d and the manifold comfort valves 460a, 460b are open, the dampers 402a, 402b, 402c, 402d are effectively decoupled from one another for improved ride comfort. It should also be appreciated that to return the suspension system 400 to this "comfort mode" of operation, the manifold valves 422a, 422b, 422c, 422d and/or the manifold comfort valves 460a, 460b may be opened while the bi-directional pump 410 is running in a second direction where the bi-directional pump 410 draws in hydraulic fluid from the pump hydraulic line 408 and discharges hydraulic fluid into the reservoir hydraulic line 418 to produce a negative pressure in the pump hydraulic line 408 that reduces fluid pressure in the hydraulic circuits 420a, 420b, 420c, 420d of the suspension system 400.

Figure 5:
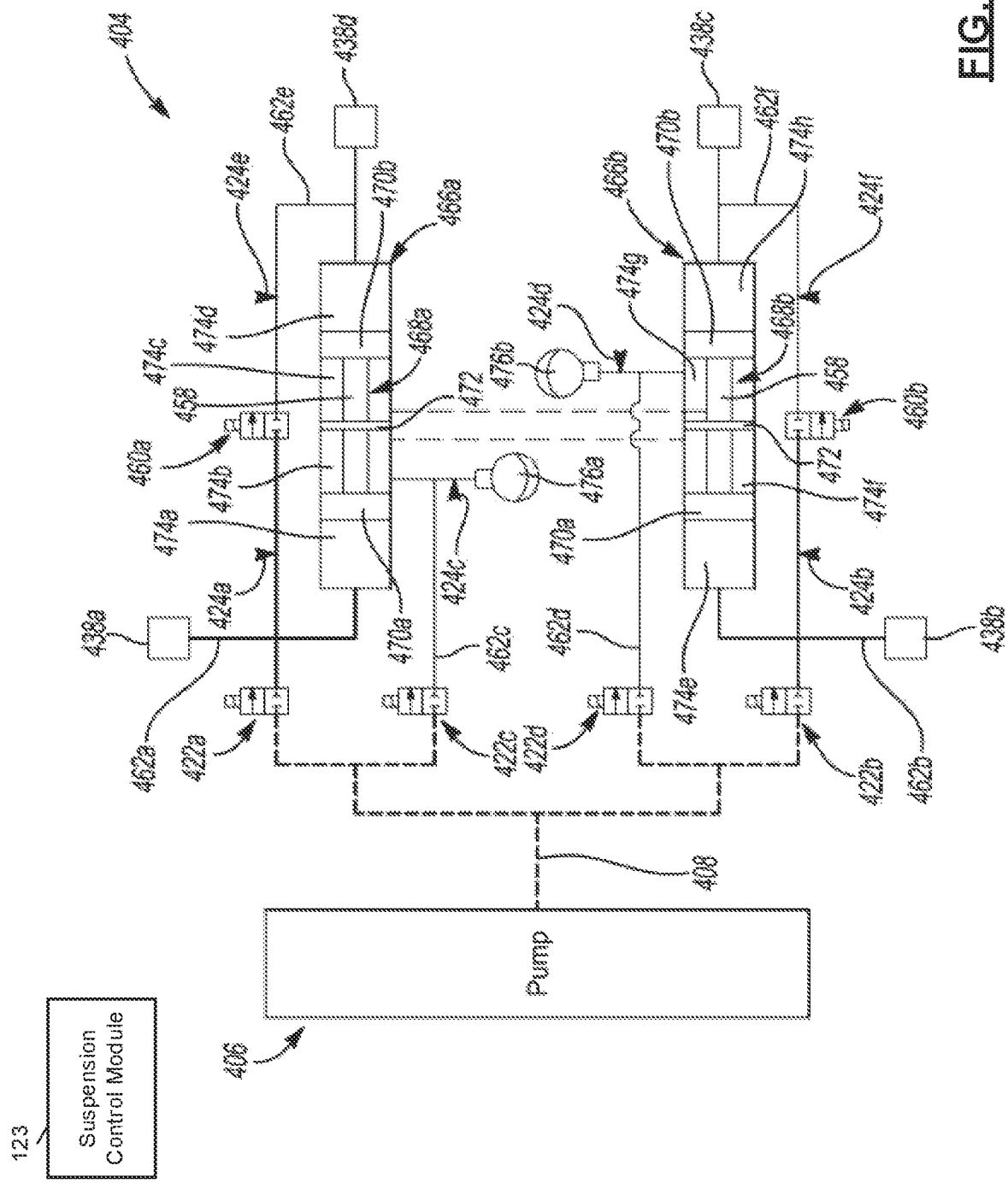
FIG. 5 is a schematic diagram illustrating the example comfort valve equipped manifold assembly illustrated in FIG. 4.

FIG. 5 illustrates the manifold assembly 404 of the suspension system 400 in more detail. The manifold assembly 404 includes first and second piston bores 466a, 466b that slidingly receive first and second floating pistons 468a, 468b, respectively. Each floating piston 468a, 468b includes a piston rod 458 and first and second piston heads 470a, 470b that are fixably coupled to opposing ends of the piston rod 458. A chamber divider 472 is fixably mounted at a midpoint of each of the first and second piston bores 466a, 466b. Each chamber divider 472 includes a through-bore that slidingly receives the piston rod 458. As such, the first piston bore 466a is divided by the first floating piston 468a into a first piston chamber 474a that is arranged in fluid communication with the first manifold conduit 462a, a second piston chamber 474b disposed between the first piston head 470a of the first floating piston 468a and the chamber divider 472 in the first piston bore 466a, a third piston chamber 474c disposed between the second piston head 470b of the first floating piston 468a and the chamber divider 472 in the first piston bore 466a, and a fourth piston chamber 474d that is arranged in fluid communication with the fifth manifold conduit 462e. Similarly, the second piston bore 466b is divided by the second floating piston 468b into a fifth piston chamber 474e that is arranged in fluid communication with the second manifold conduit 462b, a sixth piston chamber 474f disposed between the first piston head 470a of the second floating piston 468b and the chamber divider 472 in the second piston bore 466b, a seventh piston chamber 474g disposed between the second piston head 470b of the second floating piston 468b and the chamber divider 472 in the second piston bore 466b, and an eighth piston chamber 474h that is arranged in fluid communication with the sixth manifold conduit 462f. Optionally, biasing members (e.g., springs) (not shown) may be placed in the second, third, sixth, and seventh piston chambers 474b, 474c, 474f, 474g to naturally bias the first and second floating pistons 468a, 468b to a centered position where the second and third piston chambers 474b, 474c and the sixth and seventh piston chambers 474f, 474g have equal volumes.

The first manifold conduit 462a is arranged in fluid communication with the first manifold hydraulic line 438a, the second manifold conduit 462b is arranged in fluid communication with the second manifold hydraulic line 438b, the fifth manifold conduit 462e is arranged in fluid communication with the fourth manifold hydraulic line 438d, and the sixth manifold conduit 462f is arranged in fluid communication with the third manifold hydraulic line 438c. The third manifold conduit 462c is arranged in fluid communication with the second and sixth piston chambers 474b, 474f while the fourth manifold conduit 462d is arranged in fluid communication with the third and seventh piston chambers 474c, 474g. As a result, fluid pressure in the fourth piston chamber 474d and thus the fifth manifold conduit 462e can be increased independently of the first manifold conduit 462a by closing the first manifold comfort valve 460a and opening the fourth manifold valve 422d when the bi-directional pump 410 is running in the first direction, which increases pressure in the third piston chamber 474c and urges the first floating piston 468a to the right in FIG. 5, decreasing the volume of the fourth piston chamber 474d and increasing the pressure in the fourth piston chamber 474d. Similarly, fluid pressure in the eighth piston chamber 474h and thus the sixth manifold conduit 462f can be increased independently of the second manifold conduit 462b by closing the second manifold comfort valve 460b and opening the fourth manifold valve 422d when the bi-directional pump 410 is running in the first direction, which increases pressure in the seventh piston chamber 474g and urges the second floating piston 468b to the right in FIG. 5, decreasing the volume of the eighth piston chamber 474h and increasing the pressure in the eighth piston chamber 474h.

Fluid pressure in the first piston chamber 474a and thus the first manifold conduit 462a can also be increased without opening the first manifold valve 422a by actuating the first floating piston 468a, where the first manifold comfort valve 460a is closed and the third manifold valve 422c is open when the bi-directional pump 410 is running in the first direction, which increases pressure in the second piston chamber 474b and urges the first floating piston 468a to the left in FIG. 5, decreasing the volume of the first piston chamber 474a and increasing the pressure in the first piston chamber 474a. Similarly, fluid pressure in the fifth piston chamber 474e and the second manifold conduit 462b can also be increased without opening the second manifold valve 422b by actuating the second floating piston 468b, where the second manifold comfort valve 460b is closed and the third manifold valve 422c is open when the bi-directional pump 410 is running in the first direction, which increases pressure in the sixth piston chamber 474f and urges the second floating piston 468b to the left in FIG. 5, decreasing the volume of the fifth piston chamber 474e and increasing the pressure in the second piston chamber 474e.

The manifold assembly 404 may further include a first manifold accumulator 476a that is arranged in fluid communication with the third manifold conduit 462c between the third manifold valve 422c and the second and sixth piston chambers 474b, 474f and a second manifold accumulator 476b that is arranged in fluid communication with the fourth manifold conduit 462d between the third and seventh piston chambers 474c, 474g. The first and second manifold accumulators 476a, 476b may be constructed in a number of different ways. For example and without limitation, the first and second manifold accumulators 476a, 476b may have accumulation chambers and pressurized gas chambers that are separated by floating pistons or flexible membranes. Under braking, fluid flow within the four hydraulic circuits generates a pressure difference between the first and second manifold accumulators 476a, 476b, which in turn causes an increase in pressure in the front left and front right accumulators 442a, 442b and provides a pitch stiffness that resists the compression of the front dampers 402a, 402b and rebound/extension of the back dampers 402c, 402d. Under acceleration, fluid flow within the four hydraulic circuits generates an opposite pressure difference between the first and second manifold accumulators 476a, 476b, which in turn causes an increase in pressure in the back left and back right accumulators 442c, 442d and provides a pitch stiffness that resists the rebound/extension of the front dampers 402a, 402b and compression of the back dampers 402c, 402d. Additional pitch resistance can be added before a braking or acceleration event by opening the third and fourth manifold valves 422c, 422d as the bi-directional pump 410 is running in the first direction. The bi-directional pump 410 draws in hydraulic fluid from the reservoir hydraulic line 418 and discharges hydraulic fluid into the pump hydraulic line 408 to produce a positive pressure in the pump hydraulic line 408, which increases fluid pressure in the first and second manifold accumulators 476a, 476b. In a similar way, the pitch stiffness of the system can be reduced before a braking or acceleration event by running the bi-directional pump 410 in the second direction while the third and fourth manifold valves 422c, 422d.

The manifold assembly 404 may also include six pressure sensors 424a, 424b, 424c, 424d, 424e, 424f: a first pressure sensor 424a arranged to monitor fluid pressure in the first manifold conduit 462a, a second pressure sensor 424b arranged to monitor fluid pressure in the second manifold conduit 462b, a third pressure sensor 424c arranged to monitor fluid pressure in the third manifold conduit 462c, a fourth pressure sensor 424d arranged to monitor fluid pressure in the fourth manifold conduit 462d, a fifth pressure sensor 424e arranged to monitor fluid pressure in the fifth manifold conduit 462e, and a sixth pressure sensor 424f arranged to monitor fluid pressure in the sixth manifold conduit 462f. While not shown in FIG. 5, the pressure sensors 424a, 424b, 424c, 424d, 424e, 424f are all electrically connected to the suspension control module 123.

Figure 6:
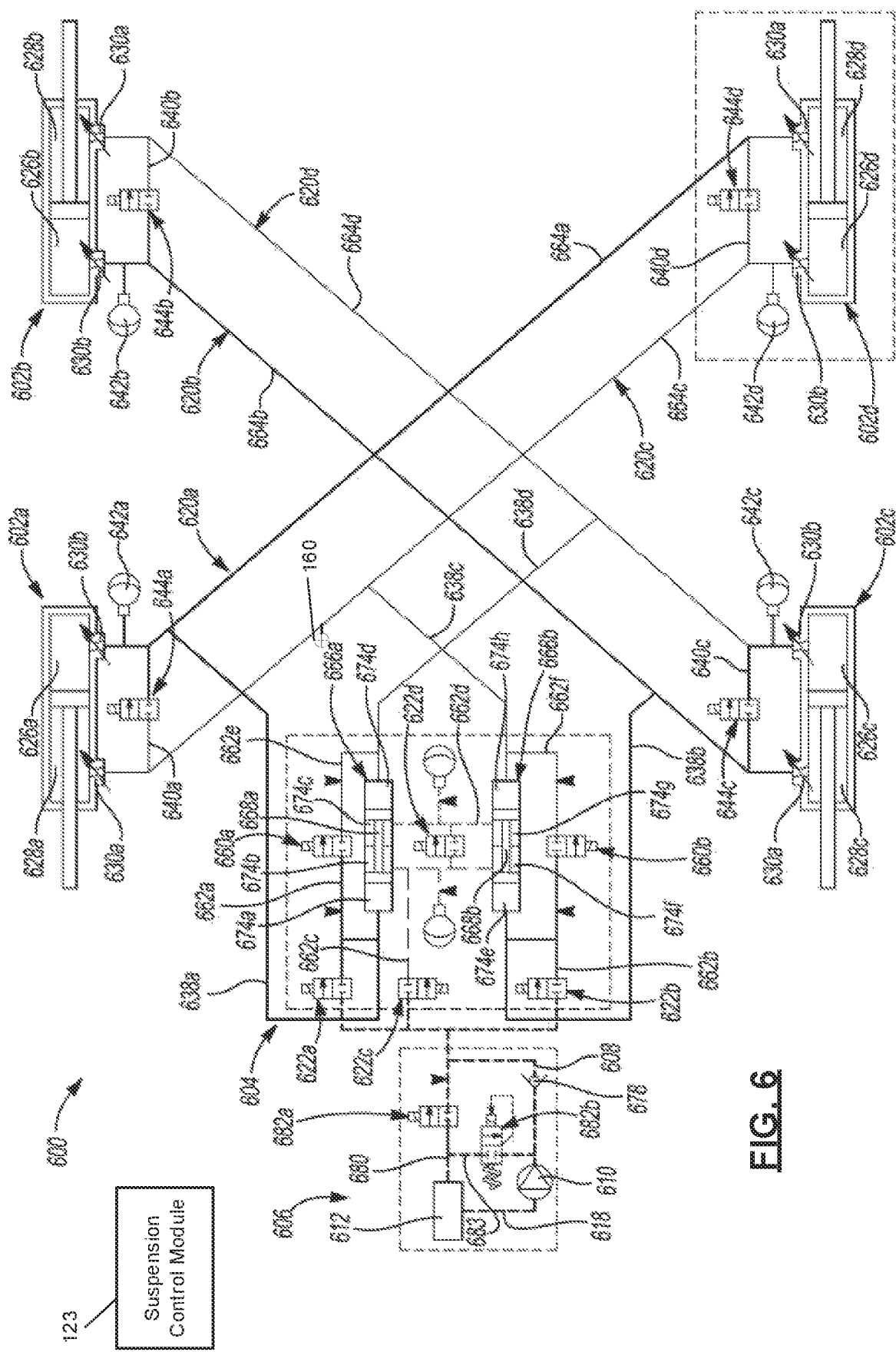
FIG. 6 is a schematic diagram illustrating an example suspension system that includes four hydraulic circuits connecting the front and rear dampers and an example comfort valve equipped manifold assembly.

FIG. 6 illustrates another suspension system 600 that shares many of the same components as the suspension system 400 illustrated in FIGS. 4 and 5, but in FIG. 6 different pump 610 and manifold assemblies 604 have been utilized. Rather than repeat the description set forth above, the following paragraphs describe the structure and function of the components in FIG. 6 that are new and/or different from those shown and described in connection with FIGS. 4 and 5. It should be appreciated that the reference numbers in FIGS. 4 and 5 are "400" series numbers (e.g., 400, 402, 404, etc.) whereas the components in FIG. 6 that are the same or similar to the components of the suspension system 400 shown in FIGS. 4 and 5 share the same base reference numbers, but are listed as "600" series numbers (e.g., 600, 602, 604, etc.). Thus, the same description for element 400 above applies to element 600 in FIG. 6 and so on and so forth.

The pump assembly 606 illustrated in FIG. 6 includes a single direction pump 610 with an inlet port that is connected in fluid communication with the hydraulic reservoir 612 by a reservoir hydraulic line 618 and an outlet port that is connected to the pump hydraulic line 608. In operation, the single direction pump 610 draws in hydraulic fluid from the reservoir hydraulic line 618 via the inlet port and discharges hydraulic fluid into the pump hydraulic line 608 via the outlet port. As such, the single direction pump 610 produces a positive pressure in the pump hydraulic line 608 that can be used by manifold assembly 604 to increase fluid pressure in the suspension system 600. A check valve 678 is positioned in the pump hydraulic line 608 to prevent back feed when the single direction pump 610 is turned off. The pump assembly 606 also includes a return hydraulic line 680 that extends from the pump hydraulic line 108 to the hydraulic reservoir 612. A first pump valve 682a is positioned in-line with the return hydraulic line 680. The pump assembly 606 also includes a pump bridge hydraulic line 683 that includes a second pump valve 682b mounted in-line with the pump bridge hydraulic line 683. The pump bridge hydraulic line 683 connects to the pump hydraulic line 608 at a location between the single direct pump 610 and the check valve 678 and connects to the return hydraulic line 680 at a location between the first pump valve 682a and the hydraulic reservoir 612. In accordance with this arrangement, fluid pressure in the pump hydraulic line 608 can be increased by turning on the pump 610 and closing the second pump valve 682b and fluid pressure in the pump hydraulic line 608 can be decreased by turning the pump 610 off and opening the first pump valve 682a.

In the example illustrated in FIG. 6, only three manifold valves 622a, 622b, 622c (i.e., the first manifold valve 622a, the second manifold valve 622b, and the third manifold valve 622c) are connected in parallel with the pump hydraulic line 608. The fourth manifold valve 622d is positioned between the first and second piston bores 666a, 666b and is arranged in fluid communication with the third manifold conduit 662c on one side and the fourth manifold conduit 662d on the other side. Thus, to increase fluid pressure in the fifth and/or sixth manifold conduits 662e, 662f independently of the first and second manifold conduits 662a, 662b, the third and fourth manifold valves 622c, 622d must be open while the pump 610 is running and the first and second manifold comfort valves 660a, 660b are closed to increase fluid pressure in the third and seventh piston chambers 674c, 674g, which urges the first and second floating pistons 668a, 668b to the right in FIG. 6 decreasing the volume of the fourth and eighth piston chambers 674d, 674h and increasing the pressure in the fourth and eighth piston chambers 674d, 674h.

Figure 7:
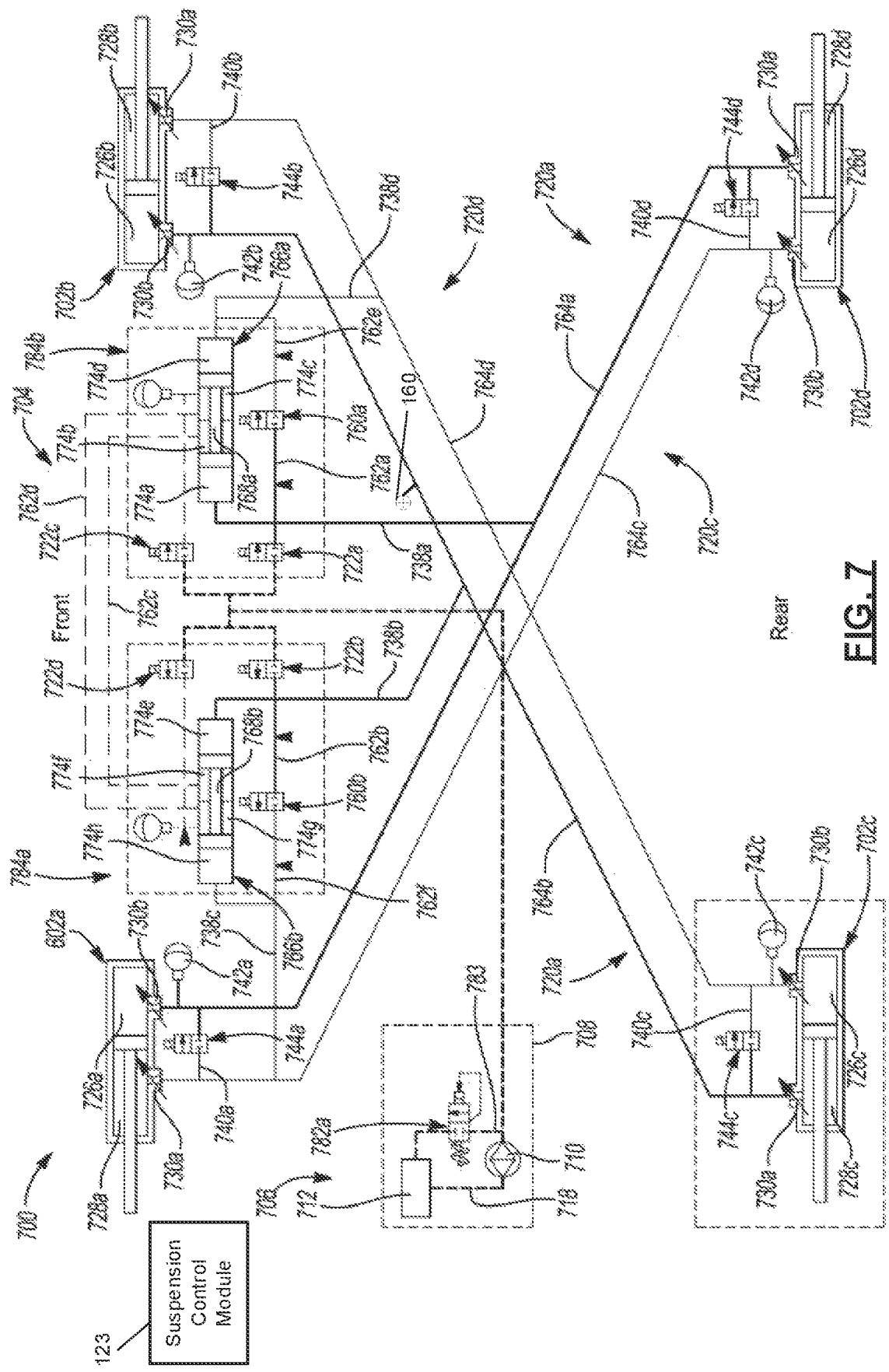
FIG. 7 is a schematic diagram illustrating an example suspension system that includes four hydraulic circuits connecting the front and rear dampers and an example comfort valve equipped manifold assembly.

FIG. 7 illustrates another suspension system 700 that shares many of the same components as the suspension system 400 illustrated in FIGS. 4 and 5, but in FIG. 7 a different manifold assembly 704 has been utilized. Rather than repeat the description set forth above, the following paragraphs describe the structure and function of the components in FIG. 7 that are new and/or different from those shown and described in connection with FIGS. 4 and 5. It should be appreciated that the reference numbers in FIGS. 4 and 5 are "400" series numbers (e.g., 400, 402, 404, etc.) whereas the components in FIG. 7 that are the same or similar to the components of the suspension system 400 shown in FIGS. 4 and 5 share the same base reference numbers, but are listed as "700" series numbers (e.g., 700, 702, 704, etc.). Thus, the same description for element 400 above applies to element 700 in FIG. 7 and so on and so forth.

The manifold assembly 704 illustrated in FIG. 7 has the same components and hydraulic arrangement as the manifold assembly 404 illustrated in FIGS. 4 and 5, but in FIG. 7 the placement of the various components of the manifold assembly 704 is different to allow the manifold assembly 704 to be packaged in the front of the vehicle between the front dampers 702a, 702b. The manifold assembly 704 illustrated in FIG. 7 includes a front left sub-assembly 784a and a front right sub-assembly 784b. The front right sub-assembly 784b includes the first piston bore 766a, the first floating piston 768a, the first manifold valve 722a, the third manifold valve 722c, the first manifold conduit 762a, and the fifth manifold conduit 762e. The front left sub-assembly 784a includes the second piston bore 466b, the second floating piston 768b, the second manifold valve 722b, the fourth manifold valve 722d, the second manifold conduit 762b, and the sixth manifold conduit 762f. The pump hydraulic line 708 extends between the front left and front right sub-assemblies 784a, 784b and splits to connect to the manifold valves 722a, 722b, 722c, 722d on either side. The third and fourth manifold conduits 762c, 762d extend laterally between the front left and front right sub-assemblies 784a, 784b to connect the second and sixth piston chambers 774b, 774f and the third and seventh piston chambers 774c, 774g, respectively. It should be appreciated that the order and arrangement of the piston chambers 774e, 774f, 774g, 774h in the second piston bore 766b shown in FIG. 7 is opposite from that shown in FIGS. 4 and 5. In other words, in accordance with the arrangement shown in FIG. 7, the first piston chamber 774a (which is connected in fluid communication with the first manifold conduit 762a) faces the fifth piston chamber 774e (which is connection in fluid communication with the second manifold conduit 762b). In other words, in FIG. 7 the fifth piston chamber 774e (which is connection in fluid communication with the second manifold conduit 762b) is to the right of the eighth piston chamber 774h (which is connected in fluid communication with the sixth manifold conduit 762f), whereas in FIGS. 4 and 5 the fifth piston chamber 474e (which is connected in fluid communication with the second manifold conduit 462b) is to the left of the eighth piston chamber 474h (which is connected in fluid communication with the sixth manifold conduit 462f). This reversal of the arrangement of the piston chambers 774e, 774f, 774g, 774h in the second piston bore 766b simplifies and shortens the runs required for the manifold hydraulic lines 738a, 738b, 738c, 738d and is therefore advantageous.

Figure 8:
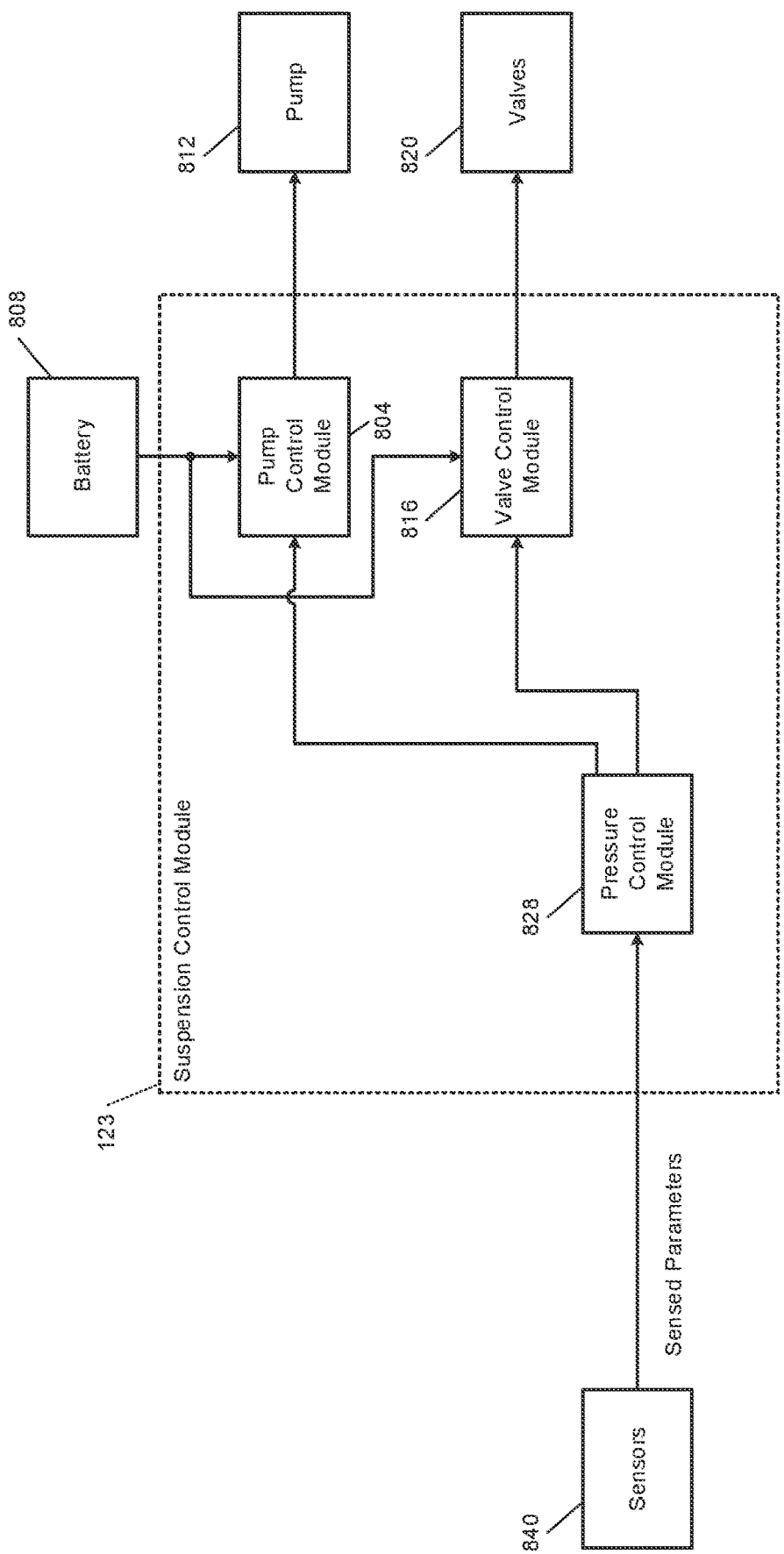
FIG. 8 includes a functional block diagram of an example implementation of a suspension control module.

FIG. 8 includes a functional block diagram of an example implementation of the suspension control module 123. A pump control module 804 receives power from a battery 808 of the vehicle. The pump control module 804 controls operation, speed, and direction of operation of a pump 812 of the suspension system. More specifically, the pump control module 804 controls application of power to the pump 812 of the suspension system. Examples of the pump 812 are discussed above. For example, in the examples of FIGS. 1-4, the pump control module 804 controls application of power to the pump 110, 210, 310, or 410. In the examples of FIGS. 6 and 7, the pump control module 804 controls application of power to the pump 610 or 710. The pump control module 804 may control, for example, a polarity of power applied to the pump 812, a frequency of power applied to the pump 812, a magnitude of voltage applied to the pump 812, and/or a current through the pump 812. In various implementations, the pump control module 804 may control the pump 812 using pulse width modulation (PWM) control by controlling a duty cycle of signal applied to the pump 812.

The pump control module 804 controls the pump 812 based on a pump command and an air volume (AV) command, which are discussed further below. The pump control module 804 may, for example, set the duty cycle of the signal applied to the pump 812 using one, two, or all of: (a) proportional (P) control to minimize a difference between the air volume command and the pump volume command, (b) integral (I) control to minimize the difference between the air volume command and the pump volume command, and (c) feed forward control to adjust first and second pressures (P1 and P2) toward a target pressure.

A valve control module 816 controls actuation (e.g., opening and closing) of valves 820 of the suspension system. Examples of the valves 820 are discussed above with respect to examples of FIGS. 1-7 and include seat valves, comfort valves, and other types of valves. For example, the valve control module 816 controls actuation of the seat valves 122a and b in the example of FIG. 1, seat valves 222a and b in the example of FIG. 2, 322a and b in the example of FIG. 3, seat valves 422a and 422b in the example of FIG. 4, seat valves 622a and 622b in the example of FIG. 6, and seat valves 722a and 722b in the example of FIG. 7. The seat valves will be referred to collectively as seat valves in the following. Seat valves regulate flow of hydraulic fluid flow to at least one-half of the suspension system from the pump 812 and from the at least one-half of the suspension system back to the tank (e.g., the tank 112).

The valve control module 816 controls the seat valves according to valve commands, respectively, which are discussed further below. For example, the valve control module 816 may fully open a valve when the valve command for that valve is set to open, and the valve control module 816 may fully close a valve when the valve command for that valve is set to close. The valve control module 816 may open a valve to between fully open and fully closed when the valve command for that valve is set to a position between fully open and fully closed.

A pressure control module 828 generates the valve commands and the pump command as described below. The pressure control module 828 generates the valve commands and the pump command based on measurements from one or more sensors 840 and one or more other inputs, as discussed further below.

Referring back to FIG. 1, the tank 112 may not be accessible to add hydraulic fluid into the suspension system or to remove hydraulic fluid from the system. The tank 112 may not include a port, opening, inlet, nozzle, etc. through which hydraulic fluid can be externally input to the tank 112 or externally removed from the tank 112.

As such, the suspension system may include a quick connect valve 160. The quick connect valve 160 may be fluidly connected, for example, to the line 132a or in another suitable location. While the quick connect valve 160 is shown in the example of FIG. 1, the quick connect valve 160 can be included in all of the suspension systems above and the following is also applicable to all of the example embodiments shown and described. In various implementations, two or more quick connect valves may be included.

Figure 9:
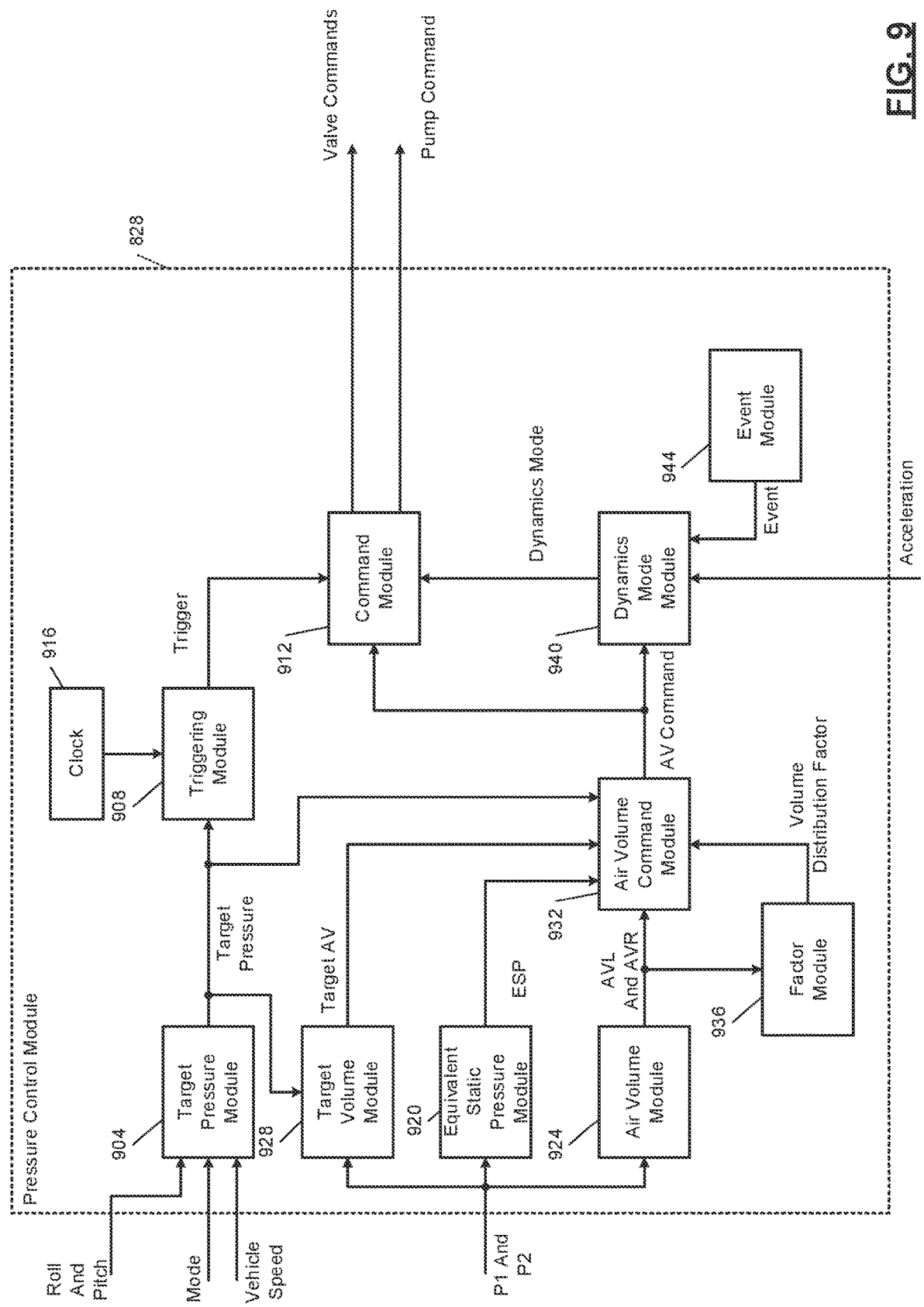
FIG. 9 is a functional block diagram of an example implementation of a pressure control module.
Figure 10:
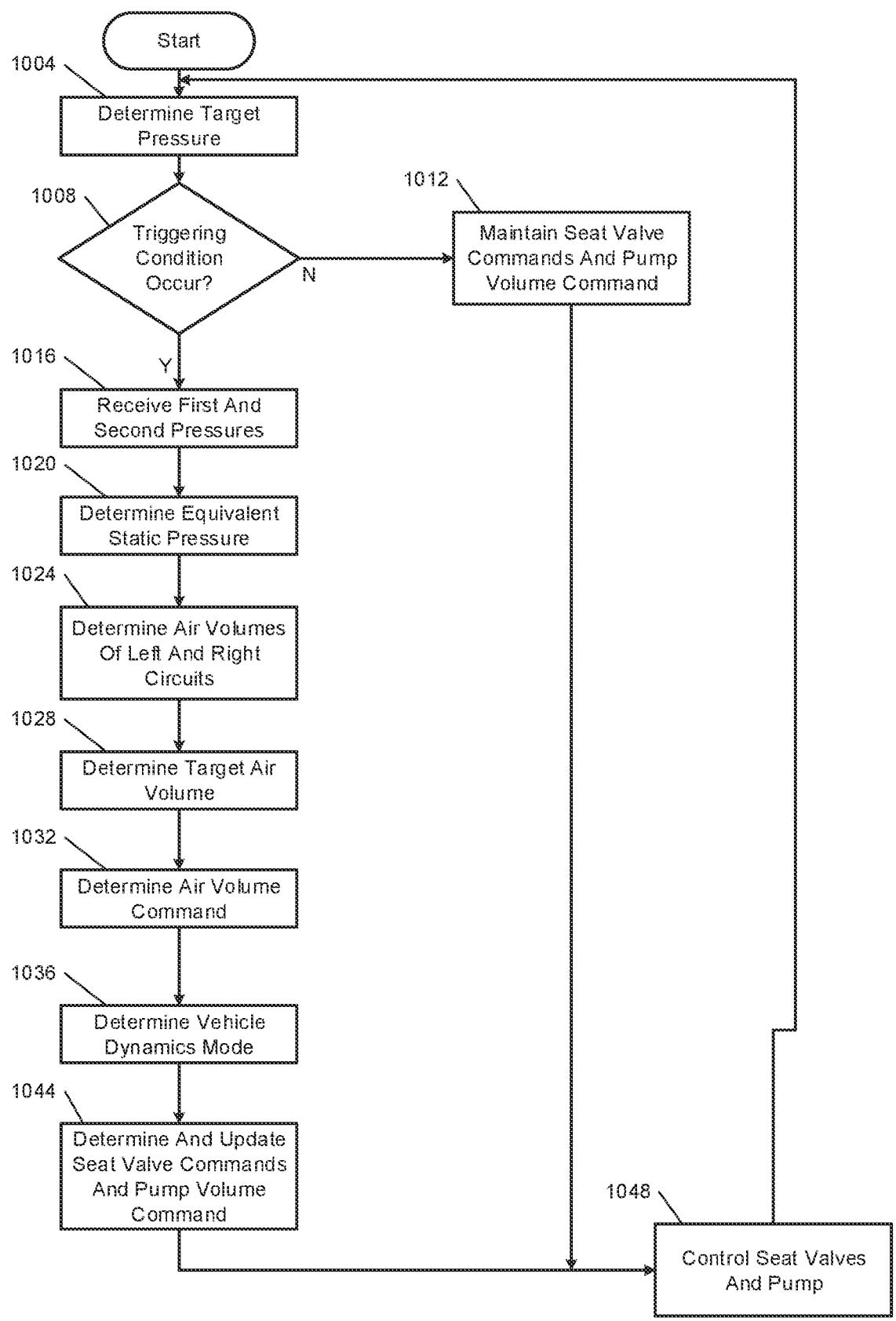
FIG. 10 is a flowchart depicting an example method of controlling pressures within a suspension system.

FIG. 9 is a functional block diagram of an example implementation of the pressure control module 828. FIG. 10 is a flowchart depicting an example method of controlling pressures within a suspension system and generating the valve and pump commands. While FIGS. 9 and 10 will be discussed together, note that reference numbers starting with 9 (e.g., 904, 908, etc.) are illustrated in FIG. 9, while reference numbers starting with 10 (e.g., 1004, 1008, etc.) are illustrated in FIG. 10.

At 1004, a target pressure module 904 determines a target pressure within the suspension system. The target pressure module 904 determines the target pressure based on a roll and pitch of the vehicle, a mode of the suspension system (e.g., comfort, normal, sport, etc.), and a present vehicle speed. The roll and pitch may be measured using one or more sensors, such as a gyroscope. The vehicle speed may be measured by a sensor or determined based on one or more measured parameters, such as one or more wheel speeds. A mode selector (module) may provide the mode, such as based on user input (e.g., via a nob, button, touchscreen, etc.). The target pressure module 904 may determine the target pressure using one or more equations and/or lookup tables that relate vehicle speeds, roll and pitch, and modes to target pressures. In various implementations, the roll and pitch may be omitted, and the target pressure module 904 may determine the target pressure based on the mode and the present vehicle speed. In various implementations, the target pressure module 904 may determine a target pressure for roll and a target pressure for pitch based on the mode and the present vehicle speed.

At 1008, a triggering module 908 determines whether to trigger a command module 912 to update/determine the valve commands and the pump command. Between instances of being triggered, the command module 912 may maintain the valve commands and the pump command unchanged. In other words, the command module 912 may only determine/change/update the valve commands and the pump command in response to being triggered. The triggering module 908 may trigger the command module 912 each predetermined period, such as approximately 2 minutes or another suitable period. A clock (module) 916 or a timer module may be used to identify the passing of each predetermined period. The triggering module 908 may also trigger the command module 912 in response to the target pressure(s) changing. As such, the triggering module 908 may trigger the command module 912 when at least one of (a) a predetermined period has passed since a last triggering of the command module 912 and (b) the target pressure(s) changes. If 1008 is true, a triggering condition has occurred, and control continues with 1016. If 1008 is false, the command module 912 does not change (i.e., maintains) the valve commands and the pump command at 1012, and control continues with 1048, which is discussed further below.

At 1016, present first and second pressures (P1 and P2) are received from first and second pressure sensors, such as 124a and b, respectively, of FIG. 1 in the example of the seat valves 122a and b of FIG. 1. The first and second pressure sensors 124a and 124b measure pressures in right and left circuits of the suspension system. Other pressure sensors may be used to provide the first and second pressures in other examples. For example, pressure sensors 490a and b may provide the first and second pressures for roll pressure control in the example of FIG. 4. For pitch pressure control, pressure sensors 490c and 490d may provide the first and second pressures in the example of FIG. 4.

At 1020, an equivalent static pressure module 920 determines an equivalent static pressure (ESP) based on the first and second pressures. The equivalent static pressure module 920 may determine the ESP using one or more of an equation and a lookup table that relates first and second pressures to ESPs. At 1024, an air volume module 924 determines an air volume in the left circuit (AVL) and an air volume in the right circuit (AVR) based on the first and second pressures, respectively. For example, the air volume module 924 may determine the air volume of the left circuit using one of an equation and a lookup table that relates first pressures to air volumes of the left circuit. The air volume module 924 may determine the air volume of the right circuit using one of an equation and a lookup table that relates second pressures to air volumes of the right circuit.

At 1028, a target air volume module 928 determines a target air volume within the suspension system. The target air volume module 928 determines the target air volume based on the first and second pressures and the target pressure(s). The target air volume module 928 may determine the target air volume, for example using one or more equations and/or lookup tables that relate first, second, and target pressures to target air volumes.

At 1032, an air volume command module 932 determines an air volume command for the suspension system based on the target air volume, a total volume of the left and right circuits, the equivalent static pressure, and the target pressure(s). The air volume command module 932 determines the air volume command using one or more equations and/or lookup tables that relate target air volumes, total volumes, equivalent static pressures, and target pressures to air volume commands. For example, the air volume command module 932 may set the air volume command to at least one of (a) adjust the total volume toward the target air volume and (b) adjust the equivalent static pressure toward the target pressure(s). The air volume command module 932 may set the total volume based on or equal to the air volume of the right circuit (AVR) plus the air volume of the left circuit (AVL).

The air volume command module 932 may determine the air volume command further based on a volume distribution factor (value). A factor module 936 may determine the volume distribution factor based on the air volume of the right circuit (AVR) and the air volume of the left circuit (AVL). The factor module 936 may determine the volume distribution factor, for example, using one or more equations and/or lookup tables that relate air volumes of the right circuit (AVR) and air volumes of the left circuit (AVL) to volume distribution factors. The equation(s) and/or lookup table(s) used by the air volume command module 932 may further be based on volume distribution factors.

At 1036, a dynamics mode module 940 determines a present vehicle dynamics mode of the vehicle. The dynamics mode module 940 determines the present vehicle dynamics mode based on an event indicator and an acceleration. For roll pressure control, the acceleration is a lateral acceleration of the vehicle. For pitch pressure control, the acceleration is a longitudinal acceleration of the vehicle. While the example of FIG. 10 illustrates one loop, two loops of FIG. 10 may be executed in parallel: one loop for roll pressure control; and one loop for pitch pressure control. When the event indicator is set to a first state (e.g., 0) and the acceleration is less than a predetermined acceleration, the dynamics mode module 940 may set the present vehicle dynamics mode to a first mode (e.g., a static pressure control mode). The predetermined acceleration is calibratable and may be, for example, approximately 5 meters per second squared (5 m/s$^2$) or another suitable value. When the event indicator is set to a second state (e.g., 1) and the acceleration is less than the predetermined acceleration, the dynamics mode module 940 may set the present vehicle dynamics mode to a second mode (e.g., a dynamic pressure control mode). When the acceleration is greater than the predetermined acceleration, the dynamics mode module 940 may set the present vehicle dynamics mode to a third mode (e.g., an interrupt mode). When the acceleration transitions from greater than the predetermined acceleration to less than the predetermined acceleration, the dynamics mode module 940 sets the present vehicle dynamics mode to the one of the first and second modes immediately prior to transitioning to the third mode.

An event module 944 sets the state of the event indicator based on one or more operating parameters. Examples of the operating parameters include, for example, accelerator pedal position, brake pedal position, a steering wheel angle, and other operating parameters that indicate a cornering, braking, and/or accelerating maneuver. For example, the event module 944 may set the event indicator to the second state (e.g., 1) when one or more of the accelerator pedal position is greater than a predetermined position (e.g., 50 percent), the brake pedal positon is greater than a predetermined position (e.g., 40 percent), and a magnitude of the steering wheel angle is greater than a predetermined angle (e.g., 60 degrees) from a predetermined straight angle. The event module 944 may set the event indicator to the first state when all of the accelerator pedal position is less than the predetermined position, the brake pedal positon is less than the predetermined position, and the magnitude of the steering wheel angle is less than the predetermined angle from the predetermined straight angle.

At 1044, the command module 912 determines and updates the (seat) valve commands and the pump command. The command module 912 determines the valve commands and the pump command based on the air volume command and the present vehicle dynamics mode. When the present vehicle dynamics mode is set to the first mode, the command module 912 generates the valve and pump commands based on the air volume command to allow fluid flow to both the right and left circuits. The command module 912 may generate the valve and pump commands using one or more equations and/or lookup tables that relate air volume commands to valve and pump commands for the first mode.

When the present vehicle dynamics mode is set to the second mode, the command module 912 generates the valve and pump commands based on the air volume command to allow fluid flow to, at any given time, only one of the right circuit and the left circuit. The command module 912 may generate the valve and pump commands using one or more equations and/or lookup tables that relate air volume commands to valve and pump commands for the second mode.

When the present vehicle dynamics mode is in the third mode (regardless of the air volume command), the command module 912 generates valve commands to close the seat valves (e.g., 122*a* and 122*b*) and generates the pump command to disable/stop the pump 812. This ensures consistent suspension system characteristics during the acceleration.

At 1048, the pump control module 804 actuates the pump 812 based on the pump command, and the valve control module 816 actuates the seat valves based on the valve commands, respectively. For example, as stated above, the pump control module 804 may, for example, set the duty cycle of the signal applied to the pump 812 using one, two, or all of: (a) proportional (P) control to minimize a difference between the air volume command and the pump volume command, (b) integral (I) control to minimize the difference between the air volume command and the pump volume command, and (c) feed forward control to adjust first and second pressures (P1 and P2) toward the target pressure(s).

As described above, the suspension systems include multiple (e.g., 4 or 6) accumulators which are energy storing devices that store energy in the form of pressure. The more hydraulic fluid that is added, the more energy is stored. To control stiffness, pitch, and roll properties of a vehicle, the present application involves controlling pressure and therefore storage of the accumulators.

In various implementations, 4 accumulators may be provided for 4 corners of a vehicle, respectively, and used to control roll. In suspension systems including 6 accumulators, the 2 additional accumulators may control pitch angle of the vehicle. Different accumulator pressures may be used for different driving modes.

Measured pressures within the suspension system may, however, be misleading under cornering, braking, or accelerating conditions. One side of the vehicle will have a higher pressure than the other side during cornering (right or left will have higher pressure than the other), acceleration (rear will have higher pressure than front), and braking (front will have higher pressure than rear). The systems and methods described above control volume within each accumulator and does so independently of the pressure differences associated with roll and pitch events.

As described above, volume is used instead of pressure to avoid the problem of unequal pressures being measured during roll and/or pitch events. Knowing the pressure in an accumulator provides knowledge regarding the volume of hydraulic fluid within the accumulator. The total volume of hydraulic fluid in the suspension system remains the same since the suspension system is a closed system during vehicle operation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A control system for a suspension system of a vehicle, the control system comprising:
    a target volume module configured to determine a target volume of hydraulic fluid within the suspension system of the vehicle based on a target pressure of the hydraulic fluid within the suspension system;
    a volume command module configured to generate a volume command based on the target volume and a present volume of the hydraulic fluid within first and second circuits of the suspension system;
    a command module configured to, based on the volume command, generate:
        a pump command for an electric hydraulic fluid pump; and
        first and second valve commands for first and second seat valves that regulate hydraulic fluid flow to and from the first and second circuits, respectively, of the suspension system;
    a valve control module that actuates the first and second seat valves based on the first and second valve commands, respectively; and
    a pump control module that controls operation of the electric hydraulic fluid pump based on the pump command.

2. The control system of claim 1 wherein the volume command module is configured to generate the volume command based on adjusting the present volume of the hydraulic fluid within the first and second circuits of the suspension system toward the target volume.

3. The control system of claim 1 wherein the volume command module is configured to generate the volume command further based on the target pressure and first and second pressures within the first and second circuits, respectively, of the suspension system.

4. The control system of claim 3 further comprising an equivalent static pressure module configured to determine an equivalent static pressure based on the first and second pressures,
    wherein the volume command module is configured to generate the volume command based on adjusting the equivalent static pressure toward the target pressure.

5. The control system of claim 1 further comprising a target pressure module configured to determine the target pressure based on at least one of (a) a roll of the vehicle and (b) a pitch of the vehicle.

6. The control system of claim 1 further comprising a target pressure module configured to determine the target pressure further based on a vehicle speed.

7. The control system of claim 1 further comprising a target pressure module configured to determine the target pressure further based on a mode of the suspension system.

8. The control system of claim 1 further comprising a volume module configured to:
    determine a first volume of hydraulic fluid in the first circuit based on a first pressure within the first circuit; and
    determine a second volume of hydraulic fluid in the second circuit based on a second pressure within the second circuit,
    wherein the volume command module is configured to determine the present volume of the hydraulic fluid within first and second circuits of the suspension system based on a sum of the first volume and the second volume.

9. The control system of claim 8 further comprising a factor module configured to determine a volume distribution factor based on the first and second volumes,
    wherein the volume command module is configured to determine the volume command further based on the volume distribution factor.

10. The control system of claim 1 further comprising a dynamics mode module configured to set a vehicle dynamics mode based on an acceleration of the vehicle,
    wherein the command module is configured to generate the pump command, the first valve command, and the second valve command further based on the vehicle dynamics mode.

11. A control method for a suspension system of a vehicle, the control method comprising:
    determining a target volume of hydraulic fluid within the suspension system of the vehicle based on a target pressure of the hydraulic fluid within the suspension system;
    generating a volume command based on the target volume and a present volume of the hydraulic fluid within first and second circuits of the suspension system;
    based on the volume command, generating:
        a pump command for an electric hydraulic fluid pump; and
        first and second valve commands for first and second seat valves that regulate hydraulic fluid flow to and from the first and second circuits, respectively, of the suspension system;

actuating the first and second seat valves based on the first and second valve commands, respectively; and controlling operation of the electric hydraulic fluid pump based on the pump command.

12. The control method of claim 11 wherein generating the volume command includes generating the volume command based on adjusting the present volume of the hydraulic fluid within the first and second circuits of the suspension system toward the target volume.

13. The control method of claim 11 wherein generating the volume command includes generating the volume command further based on the target pressure and first and second pressures within the first and second circuits, respectively, of the suspension system.

14. The control method of claim 13 further comprising determining an equivalent static pressure based on the first and second pressures,
   wherein generating the volume command includes generating the volume command based on adjusting the equivalent static pressure toward the target pressure.

15. The control method of claim 11 further comprising determining the target pressure based on at least one of (a) a roll of the vehicle and (b) a pitch of the vehicle.

16. The control method of claim 11 further comprising determining the target pressure based on a vehicle speed.

17. The control method of claim 11 further comprising determining the target pressure based on a mode of the suspension system.

18. The control method of claim 11 further comprising:
   determining a first volume of hydraulic fluid in the first circuit based on a first pressure within the first circuit; and
   determining a second volume of hydraulic fluid in the second circuit based on a second pressure within the second circuit,
   wherein determining the present volume includes determining the present volume of the hydraulic fluid within first and second circuits of the suspension system based on a sum of the first volume and the second volume.

19. The control method of claim 18 further comprising determining a volume distribution factor based on the first and second volumes,
   wherein determining the volume command includes determining the volume command further based on the volume distribution factor.

20. The control method of claim 11 further comprising setting a vehicle dynamics mode based on an acceleration of the vehicle,
   wherein generating the pump command includes generating the pump command, the first valve command, and the second valve command further based on the vehicle dynamics mode.

* * * * *